US012677212B2

(12) United States Patent
Mujumdar et al.

(10) Patent No.: US 12,677,212 B2
(45) Date of Patent: Jul. 7, 2026

(54) TASK PLANNING-DRIVEN ADAPTIVE SLICES

(71) Applicant: Telefonaktiebolaget LM Ericsson (publ), Stockholm (SE)

(72) Inventors: Anusha Pradeep Mujumdar, Bangalore (IN); Swarup Kumar Mohalik, Bangalore Karnataka (IN); Vijaya Yajnanarayana, Bangalore (IN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 667 days.

(21) Appl. No.: 17/800,061

(22) PCT Filed: Feb. 21, 2020

(86) PCT No.: PCT/IN2020/050161
§ 371 (c)(1),
(2) Date: Aug. 16, 2022

(87) PCT Pub. No.: WO2021/165977
PCT Pub. Date: Aug. 26, 2021

(65) Prior Publication Data
US 2023/0073937 A1 Mar. 9, 2023

(51) Int. Cl.
*H04W 48/18* (2009.01)
*H04W 72/1263* (2023.01)

(52) U.S. Cl.
CPC ....... *H04W 48/18* (2013.01); *H04W 72/1263* (2013.01)

(58) Field of Classification Search
CPC . H04W 48/18; H04W 72/1263; H04W 24/02; H04L 43/20; H04L 41/0895; H04L 41/5019; H04L 41/0816; H04L 41/40; H04L 41/16; H04L 43/0852; H04L 43/0876; H04L 41/5054; H04L 41/0806
See application file for complete search history.

(56) References Cited

U.S. PATENT DOCUMENTS

2018/0139106 A1* 5/2018 Senarath ................. H04L 67/51
2018/0314552 A1* 11/2018 Kim ......................... G06F 9/485
(Continued)

FOREIGN PATENT DOCUMENTS

EP 3278504 A1 2/2018
WO 2019190527 A1 10/2019

OTHER PUBLICATIONS

· Luong et al, "Multi-level Resource Scheduling for network slicing toward 5G," 2019 10th International Conference on Networks of the Future (NoF), Rome, Italy, 2019, pp. 25-31. (Year: 2019).*
(Continued)

*Primary Examiner* — Sun Jong Kim
(74) *Attorney, Agent, or Firm* — Sage Patent Group

(57) ABSTRACT

A first network node operating in a communication node can receive a plan indicating tasks to be performed by at least one second network node operating in the communication network. The first network node can determine a network slice schedule based on the tasks to be performed by the at least one second network node operating in the communication network. The first network node can provide the network slice schedule to a network slice orchestrator operating in the communication network.

20 Claims, 19 Drawing Sheets

Receive a plan indicating tasks to be performed by at least one network node
1010

Receive information associated with a task of the plurality of tasks
1020

Determine a network slice schedule based on the tasks to be performed
1030

Provide the network slice schedule to a network slice orchestrator
1040

(56) References Cited

U.S. PATENT DOCUMENTS

| | | | | | |
|---|---|---|---|---|---|
| 2018/0359337 A1* | 12/2018 | Kodaypak | ............. | H04W 72/00 |
| 2020/0045548 A1* | 2/2020 | Dowlatkhah | ........ | H04N 21/234 |
| 2021/0036920 A1* | 2/2021 | Erman | ................ | H04L 41/0894 |
| 2021/0168901 A1* | 6/2021 | Kim | ...................... | H04W 48/16 |
| 2021/0337553 A1* | 10/2021 | Chong | ............... | H04L 41/5067 |

OTHER PUBLICATIONS

International Search Report and Written Opinion of the International Searching Authority, PCT/IN2020/050161 mailed Jun. 1, 2020, 10 pages.
Huawei: "RAN configuration for network slices," RAN WG3 Meeting #93: R3-161752, Aug. 22-26, 2016, Gothenburg, Sweden, 4 pages.
OPPO: "Considerations on Mobility Issues of Network Slicing," 3GPP TSG-RAN2# AH2: R2-1706330, Jun. 27-29, 2017, Qingdao, P.R. China, 3 pages.
Ibrahim et al: "Network Slicing and Softwarization: A Survey on Principles, Enabling Technologies, and Solutions," IEEE Communications Survey & Tutorials, vol. 20, No. 3, Aug. 5, 2018, 25 pages.
Extended European Search Report for EP Patent Application No. 20920744.8, mailed Oct. 9, 2023, 10 pages.
3GPP TR 22.804 V16.2.0, "3rd Generation Partnership Project; Technical Specification Group Services and System Aspects; Study on Communication for Automation in Vertical Domains (Release 16)," Dec. 2018, Valbonne, France, 196 pages.
Fettweis, "The Tactile Internet: Applications and Challenges," IEEE Vehicular Technology Magazine, Mar. 11, 2014, 7 pages.
Frotzscher, "Requirements and current solutions of wireless communication in industrial automation," ICCC '14, W8: Workshop on 5G Technologies, Oct. 26, 2022, 6 pages.

* cited by examiner

Figure 2:
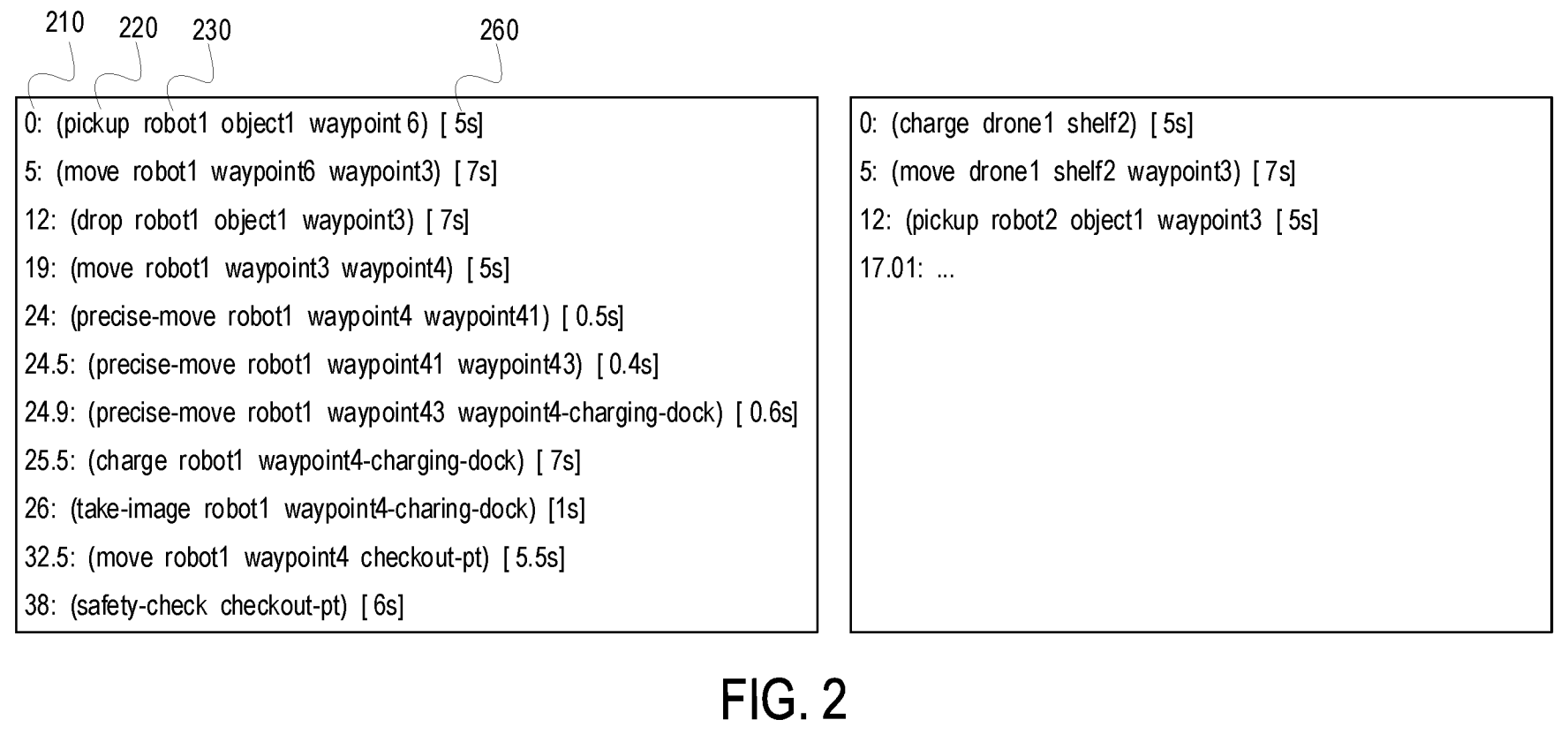

0: (pickup robot1 object1 waypoint 6) [5s]

5: (move robot1 waypoint6 waypoint3) [7s]

12: (drop robot1 object1 waypoint3) [7s]

19: (move robot1 waypoint3 waypoint4) [5s]

24: (precise-move robot1 waypoint4 waypoint41) [0.5s]

24.5: (precise-move robot1 waypoint41 waypoint43) [0.4s]

24.9: (precise-move robot1 waypoint43 waypoint4-charging-dock) [0.6s]

25.5: (charge robot1 waypoint4-charging-dock) [7s]

26: (take-image robot1 waypoint4-charing-dock) [1s]

32.5: (move robot1 waypoint4 checkout-pt) [5.5s]

38: (safety-check checkout-pt) [6s]

210
220
230
260

0: (charge drone1 shelf2) [5s]

5: (move drone1 shelf2 waypoint3) [7s]

12: (pickup robot2 object1 waypoint3 [5s]

Annotated Plan
410

Network Inventory
420

Network Slice
Scheduler
430

<[Latency1 Bandwidth1] , [0, t1]>
<[Latency2 Bandwidth2] , [t1, t2]>
<[Latency3 Bandwidth3] , [t2, t3]>
440

530

510

520

Add(S1)
(S1, 30s $20)

Add(S2)
(S1, 15s, -)      (S2, 30s, $20)

Reconfigure(S1)
(S1', 30s, $30)

Delete(S1)
(S2, 15s, -)

Reconfigure(S1')
(S1, 15s, $20)

Keep(S1)
(S1', 15s, -)

Reconfigure(S2)
(S2, 30s, $25)

Delete(S2), Add(S3)
(S3, 30s, $30)

1

2

1

2  3

3

607

Receive a plan indicating tasks to be performed by at least one network node

1010

Receive information associated with a task of the plurality of tasks

1020

Determine a network slice schedule based on the tasks to be performed

1030

Provide the network slice schedule to a network slice orchestrator

1040

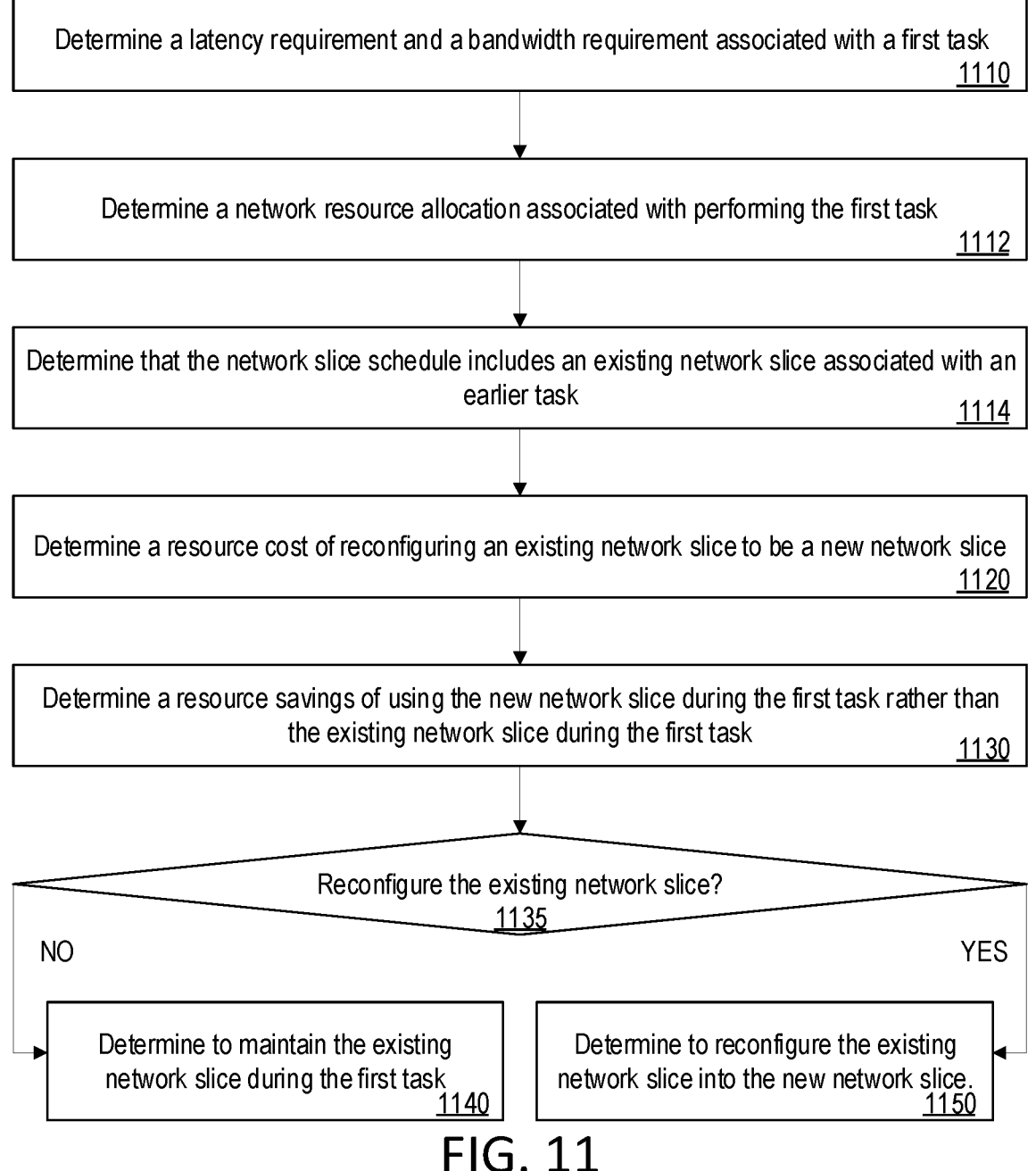

Determine a latency requirement and a bandwidth requirement associated with a first task
1110

Determine a network resource allocation associated with performing the first task
1112

Determine that the network slice schedule includes an existing network slice associated with an earlier task
1114

Determine a resource cost of reconfiguring an existing network slice to be a new network slice
1120

Determine a resource savings of using the new network slice during the first task rather than the existing network slice during the first task
1130

Reconfigure the existing network slice?
1135

NO                                                                                          YES

Determine to maintain the existing network slice during the first task
1140

Determine to reconfigure the existing network slice into the new network slice.
1150

FIG. 11

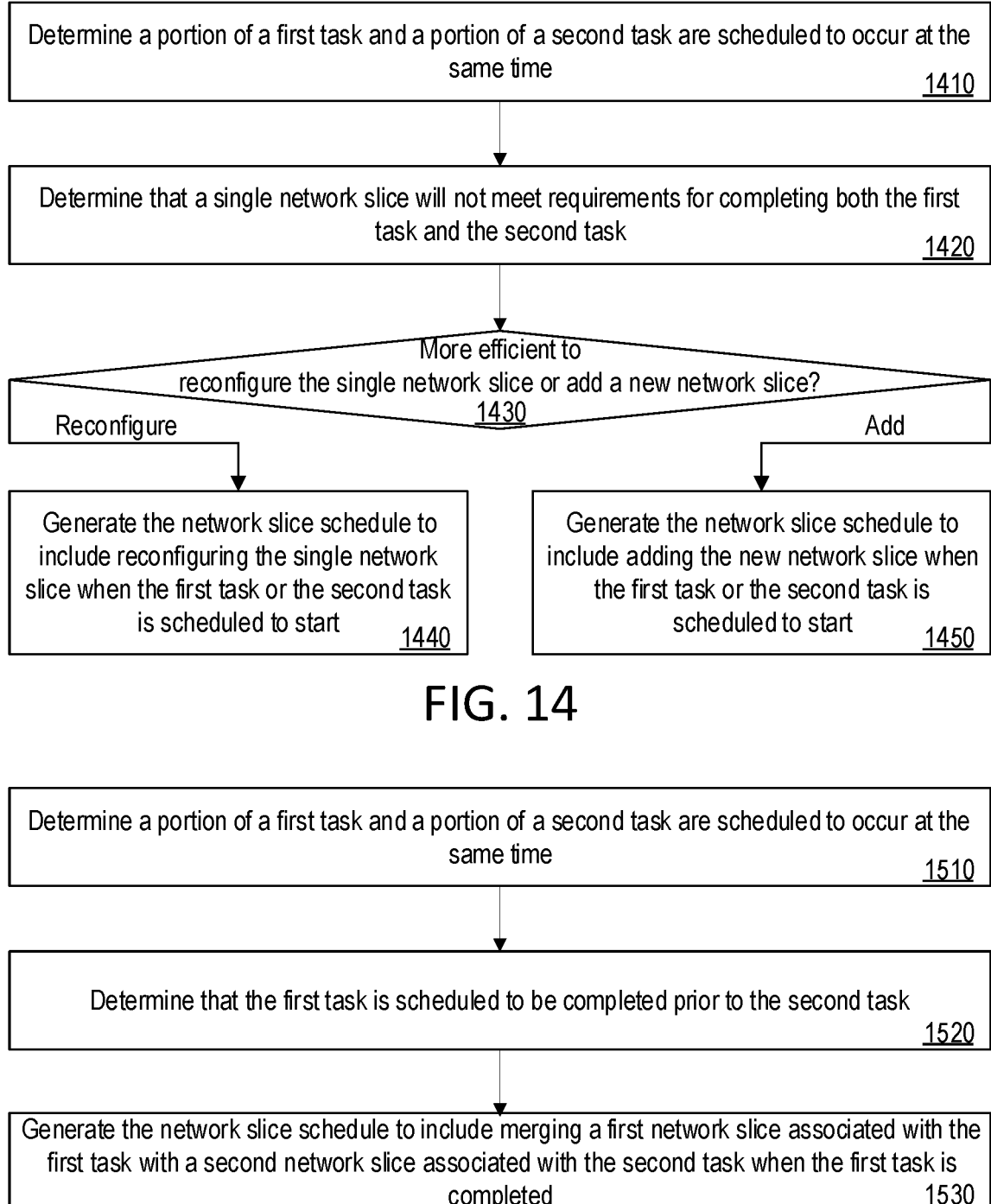

Determine a portion of a first task and a portion of a second task are scheduled to occur at the same time    1410

Determine that a single network slice will not meet requirements for completing both the first task and the second task    1420

More efficient to reconfigure the single network slice or add a new network slice?    1430

Reconfigure

Add

Generate the network slice schedule to include reconfiguring the single network slice when the first task or the second task is scheduled to start    1440

Generate the network slice schedule to include adding the new network slice when the first task or the second task is scheduled to start    1450

FIG. 14

Determine a portion of a first task and a portion of a second task are scheduled to occur at the same time    1510

Determine that the first task is scheduled to be completed prior to the second task    1520

Generate the network slice schedule to include merging a first network slice associated with the first task with a second network slice associated with the second task when the first task is completed    1530

FIG. 15

BEGIN

4710
Host computer
provides user data

4720
Host computer
initiates transmission
carrying the user data
to the UE

4730
UE receives the user
data

END

TASK PLANNING-DRIVEN ADAPTIVE SLICES

CROSS REFERENCE TO RELATED APPLICATIONS

This application is a 35 U.S.C. § 371 national stage application of PCT International Application No. PCT/IN2020/050161 filed on Feb. 21, 2020, the disclosure and content of which is incorporated by reference herein in its entirety.

TECHNICAL FIELD

The present disclosure relates generally to network slicing and more specifically to task planning-driven adaptive slices.

BACKGROUND

5th Generation ("5G") slicing is a networking architecture that enables the creation of isolated end-to-end virtual networks (herein referred to as network slices) on a physical network infrastructure. The network slices can be designed to fulfil specific requirements required by a particular application. A service level agreement ("SLA") can indicate the specific requirements required by a particular application. The SLAs for a given application are statically configured based on the mapping of the application to a particular use-case. For example, a first static SLA may be used for operations in a smart factory environment and a second SLA may be used for operations in a home environment.

SUMMARY

According to some embodiments, a method of operating a first network node in a communication network is provided. The method includes receiving a plan indicating a plurality of tasks to be performed by at least one second network node operating in the communication network. The method further includes determining a network slice schedule based on the plurality of tasks to be performed by the at least one second network node operating in the communication network. The method further includes providing the network slice schedule to a network slice orchestrator operating in the communication network.

According to other embodiments, a first network node operating in a communication network is provided. The first network node includes processing circuitry and memory coupled to the processing circuitry. The memory has instructions stored therein that are executable by the processing circuitry to cause the first network node to perform operations. The operations include receiving a plan indicating a plurality of tasks to be performed by at least one second network node operating in the communication network. The operations further include determining a network slice schedule based on the plurality of tasks to be performed by the at least one second network node operating in the communication network. The operations further include providing the network slice schedule to a network slice orchestrator operating in the communication network.

In other embodiments, a first network node operating in a communication network is provided. The first network node is adapted to perform operations. The operations include receiving a plan indicating a plurality of tasks to be performed by at least one second network node operating in the communication network. The operations further include determining a network slice schedule based on the plurality of tasks to be performed by the at least one second network node operating in the communication network. The operations further include providing the network slice schedule to a network slice orchestrator operating in the communication network.

In other embodiments, a computer program is provided. The computer program includes program code to be executed by processing circuitry of a first network node operating in a communication network. Execution of the program code causes the first network node to perform operations. The operations include receiving a plan indicating a plurality of tasks to be performed by at least one second network node operating in the communication network. The operations further include determining a network slice schedule based on the plurality of tasks to be performed by the at least one second network node operating in the communication network. The operations further include providing the network slice schedule to a network slice orchestrator operating in the communication network.

In other embodiments, a computer program product is provided. The computer program product includes a non-transitory storage medium including program code to be executed by processing circuitry of a first network node operating in a communication network. Execution of the program code causes the first network node to perform operations. The operations include receiving a plan indicating a plurality of tasks to be performed by at least one second network node operating in the communication network. The operations further include determining a network slice schedule based on the plurality of tasks to be performed by the at least one second network node operating in the communication network. The operations further include providing the network slice schedule to a network slice orchestrator operating in the communication network.

In various embodiments described herein, generating a network slice schedule with variable SLAs based on the tasks to be performed results in more accurate provisioning of network resources.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 2 is a diagram illustrating an example of a plan for an automated warehouse in accordance with some embodiments.

FIGS. 10-15 are flow charts illustrating examples of processes performed by a slice scheduler in accordance with some embodiments.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

$5^{th}$ Generation ("5G") slices can provide a flexible way to guarantee a specific service level agreement ("SLA") being met for an application. They can work well for varying levels of network traffic to guarantee a pre-determined SLA. However, 5G can be used in an environment such as a smart factory or a tactile internet that requires varied levels of performance at various times depending on the tasks involved. For example, when the task includes communicating kinesthetic information then the latency can be in the order of a few milliseconds with a packet error rate of $10/\wedge{-}4$, and when the task includes a standard locomotion in a controlled space the latency may be higher. Currently, SLAs for a given application are statically configured based on the mapping of the application to a particular use-case.

However, such a static configuration based on critical tasks in the operational loop (For example, kinesthetic communication when robot is picking up an item) could result in overprovisioning of scarce resources for the entire duration of the task or application. This can result in a significant increase in resource costs and energy over the lifetime of the network slice.

Various embodiments described herein, propose a system and/or method to overlay a task plan in a factory or warehouse with a communication schedule based on a 5G slicing technique. The communication schedule reconfigures the network slice structure based on information (e.g., criticality or safety) of individual tasks and cost of transitions between different slice structures.

Figure 6:
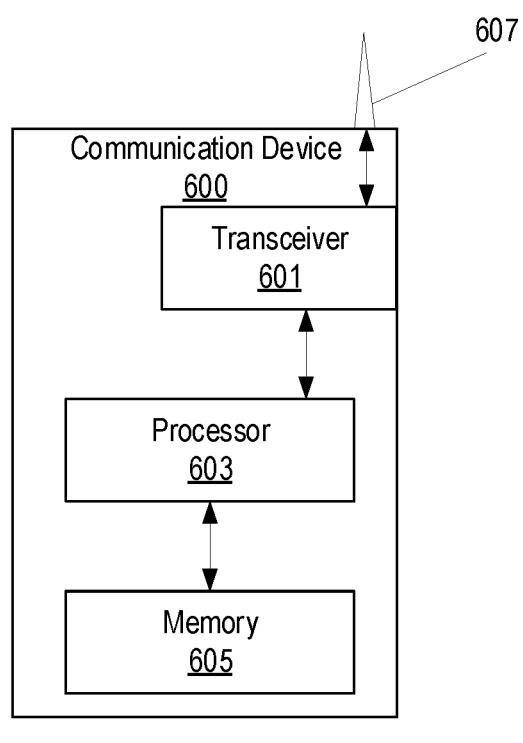
FIG. 6 is a block diagram illustrating an example of a terminal device in accordance with some embodiments.

FIG. 6 is a block diagram illustrating elements of a communication device UE 600 (also referred to as a mobile terminal, a mobile communication terminal, a wireless device, a wireless communication device, a wireless terminal, mobile device, a wireless communication terminal, user equipment, UE, a user equipment node/terminal/device, etc.) configured to provide wireless communication according to embodiments of inventive concepts. (Communication device 600 may be provided, for example, as discussed below with respect to wireless device 4110 of FIG. 16.) As shown, communication device UE 600 may include an antenna 607 (e.g., corresponding to antenna 4111 of FIG. 16), and transceiver circuitry 601 (also referred to as a transceiver, e.g., corresponding to interface 4114 of FIG. 16) including a transmitter and a receiver configured to provide uplink and downlink radio communications with a base station(s) (e.g., corresponding to network node 4160 of FIG. 16, also referred to as a RAN node) of a radio access network. Communication device UE 600 may also include processing circuitry 603 (also referred to as a processor, e.g., corresponding to processing circuitry 4120 of FIG. 16) coupled to the transceiver circuitry, and memory circuitry 605 (also referred to as memory, e.g., corresponding to device readable medium 4130 of FIG. 16) coupled to the processing circuitry. The memory circuitry 605 may include computer readable program code that when executed by the processing circuitry 603 causes the processing circuitry to perform operations according to embodiments disclosed herein. According to other embodiments, processing circuitry 603 may be defined to include memory so that separate memory circuitry is not required. Communication device UE 600 may also include an interface (such as a user interface) coupled with processing circuitry 603, and/or communication device UE may be incorporated in a vehicle.

As discussed herein, operations of communication device UE 600 may be performed by processing circuitry 603 and/or transceiver circuitry 601. For example, processing circuitry 603 may control transceiver circuitry 601 to transmit communications through transceiver circuitry 601 over a radio interface to a radio access network node (also referred to as a base station) and/or to receive communications through transceiver circuitry 601 from a RAN node over a radio interface. Moreover, modules may be stored in memory circuitry 605, and these modules may provide instructions so that when instructions of a module are executed by processing circuitry 603, processing circuitry 603 performs respective operations.

Figure 7:
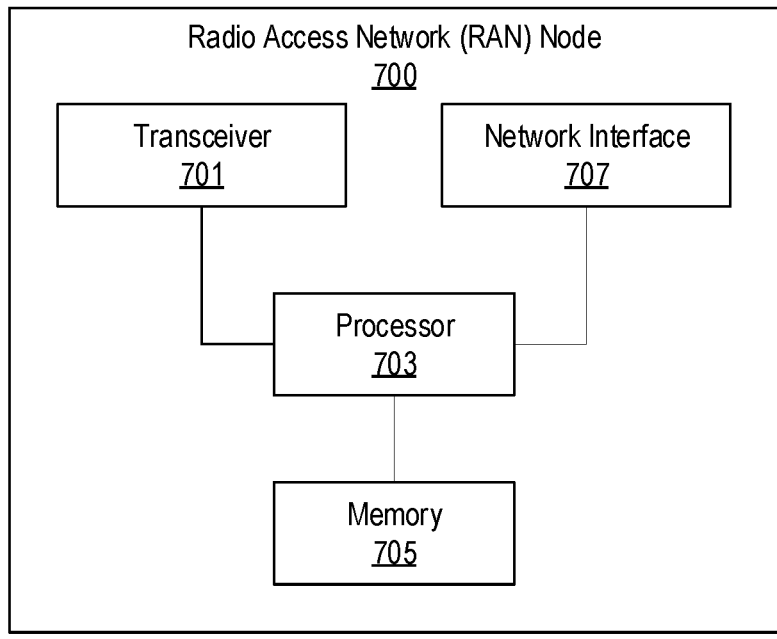
FIG. 7 is a block diagram illustrating an example of a radio access network ("RAN") node in accordance with some embodiments.

FIG. 7 is a block diagram illustrating elements of a radio access network RAN node 700 (also referred to as a network node, base station, eNodeB/eNB, gNodeB/gNB, etc.) of a Radio Access Network (RAN) configured to provide cellular communication according to embodiments of inventive concepts. (RAN node 700 may be provided, for example, as discussed below with respect to network node 4160 of FIG. 16.) As shown, the RAN node 700 may include transceiver circuitry 701 (also referred to as a transceiver, e.g., corresponding to portions of interface 4190 of FIG. 16) including a transmitter and a receiver configured to provide uplink and downlink radio communications with mobile terminals. The RAN node 700 may include network interface circuitry 707 (also referred to as a network interface, e.g., corresponding to portions of interface 4190 of FIG. 16) configured to provide communications with other nodes (e.g., with other base stations) of the RAN and/or core network CN. The RAN node 700 may also include processing circuitry 703 (also referred to as a processor, e.g., corresponding to processing circuitry 4170) coupled to the transceiver circuitry, and memory circuitry 705 (also referred to as memory, e.g., corresponding to device readable medium 4180 of FIG. 16) coupled to the processing circuitry. The memory circuitry 705 may include computer readable program code that when executed by the processing circuitry 703 causes the processing circuitry to perform operations according to embodiments disclosed herein. According to other embodiments, processing circuitry 703 may be defined to include memory so that a separate memory circuitry is not required.

As discussed herein, operations of the RAN node 700 may be performed by processing circuitry 703, network interface 707, and/or transceiver 701. For example, processing circuitry 703 may control transceiver 701 to transmit downlink communications through transceiver 701 over a radio interface to one or more mobile terminals UEs and/or to receive uplink communications through transceiver 701 from one or more mobile terminals UEs over a radio interface. Similarly, processing circuitry 703 may control network interface 707 to transmit communications through network interface 707 to one or more other network nodes and/or to receive communications through network interface from one or more other network nodes. Moreover, modules may be stored in memory 705, and these modules may provide instructions so that when instructions of a module are executed by processing circuitry 703, processing circuitry 703 performs respective operations (e.g., operations discussed below with respect to Example Embodiments relating to network nodes).

According to some other embodiments, a network node may be implemented as a core network CN node without a transceiver. In such embodiments, transmission to a wireless communication device UE may be initiated by the network node so that transmission to the wireless communication device UE is provided through a network node including a transceiver (e.g., through a base station or RAN node). According to embodiments where the network node is a RAN node including a transceiver, initiating transmission may include transmitting through the transceiver.

Figure 8:
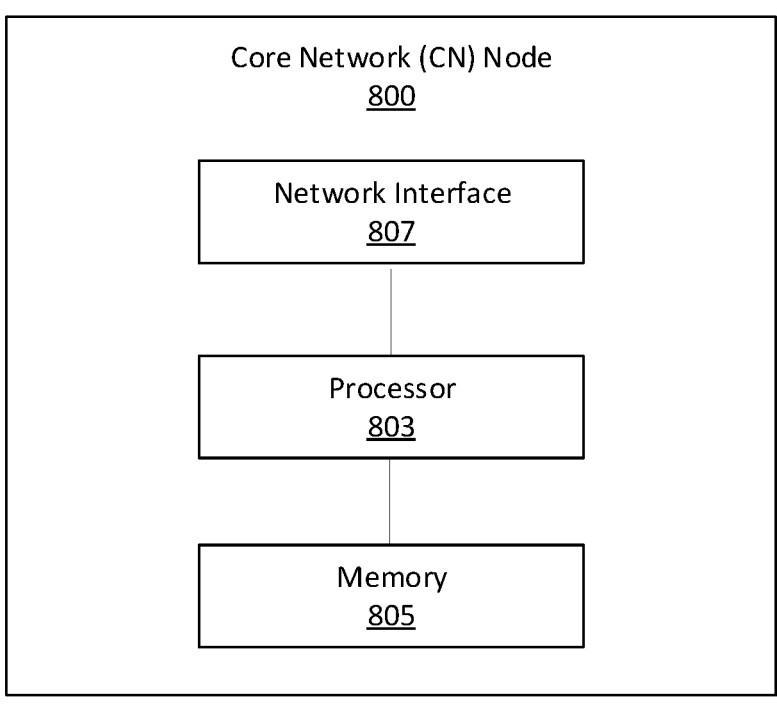
FIG. 8 is a block diagram illustrating an example of a core network ("CN") node in accordance with some embodiments.

FIG. 8 is a block diagram illustrating elements of a core network CN node 800 (e.g., an SMF node, an AMF node, etc.) of a communication network configured to provide cellular communication according to embodiments of inventive concepts. As shown, the CN node 800 may include network interface circuitry 807 (also referred to as a network interface) configured to provide communications with other nodes of the core network and/or the RAN. The CN node 800 may also include a processing circuitry 803 (also referred to as a processor) coupled to the network interface circuitry, and memory circuitry 805 (also referred to as memory) coupled to the processing circuitry. The memory circuitry 805 may include computer readable program code that when executed by the processing circuitry 803 causes the processing circuitry to perform operations according to embodiments disclosed herein. According to other embodiments, processing circuitry 803 may be defined to include memory so that a separate memory circuitry is not required.

As discussed herein, operations of the CN node 800 may be performed by processing circuitry 803 and/or network interface circuitry 807. For example, processing circuitry 803 may control network interface circuitry 807 to transmit communications through network interface circuitry 807 to one or more other network nodes and/or to receive communications through network interface circuitry from one or more other network nodes. Moreover, modules may be stored in memory 805, and these modules may provide instructions so that when instructions of a module are executed by processing circuitry 803, processing circuitry 803 performs respective operations (e.g., operations discussed below with respect to Example Embodiments relating to network nodes).

According to some other embodiments, a network node may be implemented as a network slice scheduler without a transceiver. In such embodiments, a network slice scheduler may communicate with a network slice orchestrator to schedule network slice configurations for transmissions to a terminal device UE provided through a network node including a transceiver (e.g., through a base station or RAN node).

Figure 9:
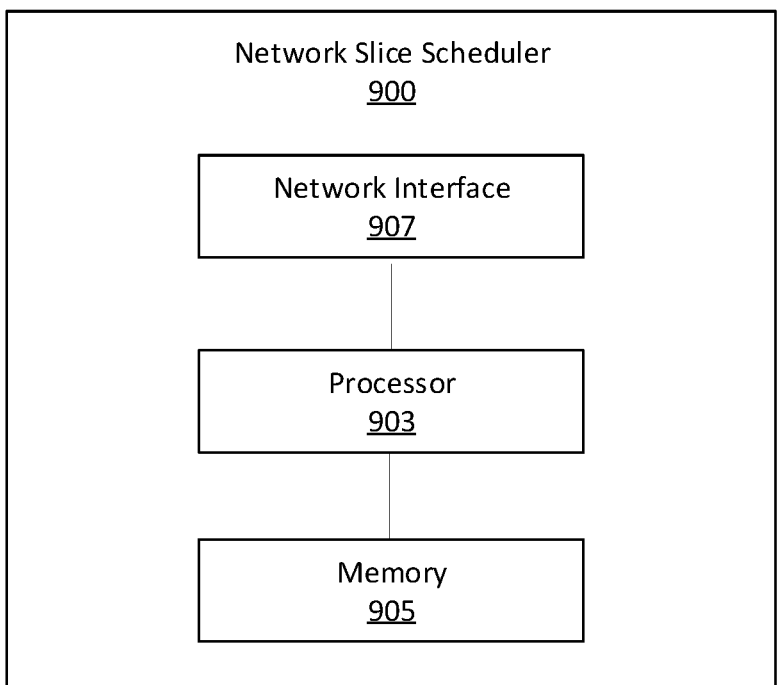
FIG. 9 is a block diagram illustrating an example of a slice scheduler in accordance with some embodiments.

FIG. 9 is a block diagram illustrating elements of a network slice scheduler 900 of a communication network configured to provide cellular communication according to embodiments of inventive concepts. As shown, the network slice scheduler 900 may include network interface circuitry 907 (also referred to as a network interface) configured to provide communications with other nodes of the core network and/or the RAN. The network slice scheduler 900 may also include a processing circuitry 903 (also referred to as a processor) coupled to the network interface circuitry, and memory circuitry 905 (also referred to as memory) coupled to the processing circuitry. The memory circuitry 905 may include computer readable program code that when executed by the processing circuitry 903 causes the processing circuitry to perform operations according to embodiments disclosed herein. According to other embodiments, processing circuitry 903 may be defined to include memory so that a separate memory circuitry is not required.

As discussed herein, operations of the network slice scheduler 900 may be performed by processing circuitry 903 and/or network interface circuitry 907. For example, processing circuitry 903 may control network interface circuitry 907 to transmit communications through network interface circuitry 907 to one or more other network nodes and/or to receive communications through network interface circuitry from one or more other network nodes. Moreover, modules may be stored in memory 905, and these modules may provide instructions so that when instructions of a module are executed by processing circuitry 903, processing circuitry 903 performs respective operations (e.g., operations discussed below with respect to Example Embodiments relating to network nodes and slice schedulers).

In some embodiments, autonomous behavior can be enabled by using artificial intelligence ("AI") Planning. In some examples, AI planning is a process of determining a sequence of actions for execution by smart devices (e.g., autonomous robots and/or unmanned vehicles) in order to achieve one or more goals. In additional or alternative examples, AI planning includes an iterative process of determining an expected result of performing different sets of actions. AI planning can autonomously derive an optimal (based on any number of goals and/or measurements) sequence of actions to take it to a desired state/behavior. AI planning can be applicable to a wide range of network-enabled systems including automated warehouses, drone-based inspection, IoT device automation etc. Each action in the sequence can have different service level agreement ("SLA") requirements. Therefore, network slices can be created, reconfigured, and torn down dynamically depending upon the varied requirements of the actions.

In some embodiments, a network slice can be assigned to an action. However, assigning individual network slices to each action may not be cost optimal and may not be feasible in some situations. For example, there may be limitations on network slice durations that may make it cost effective to continue operating an existing slice instead of reconfiguring the existing slice for a subsequent action. Network slice setup time can also be taken into account since, in some examples, the execution of an action may get delayed by the setup time. This makes both the design and orchestration (when and how to reconfigure the slice structures) non-trivial.

Figure 1:
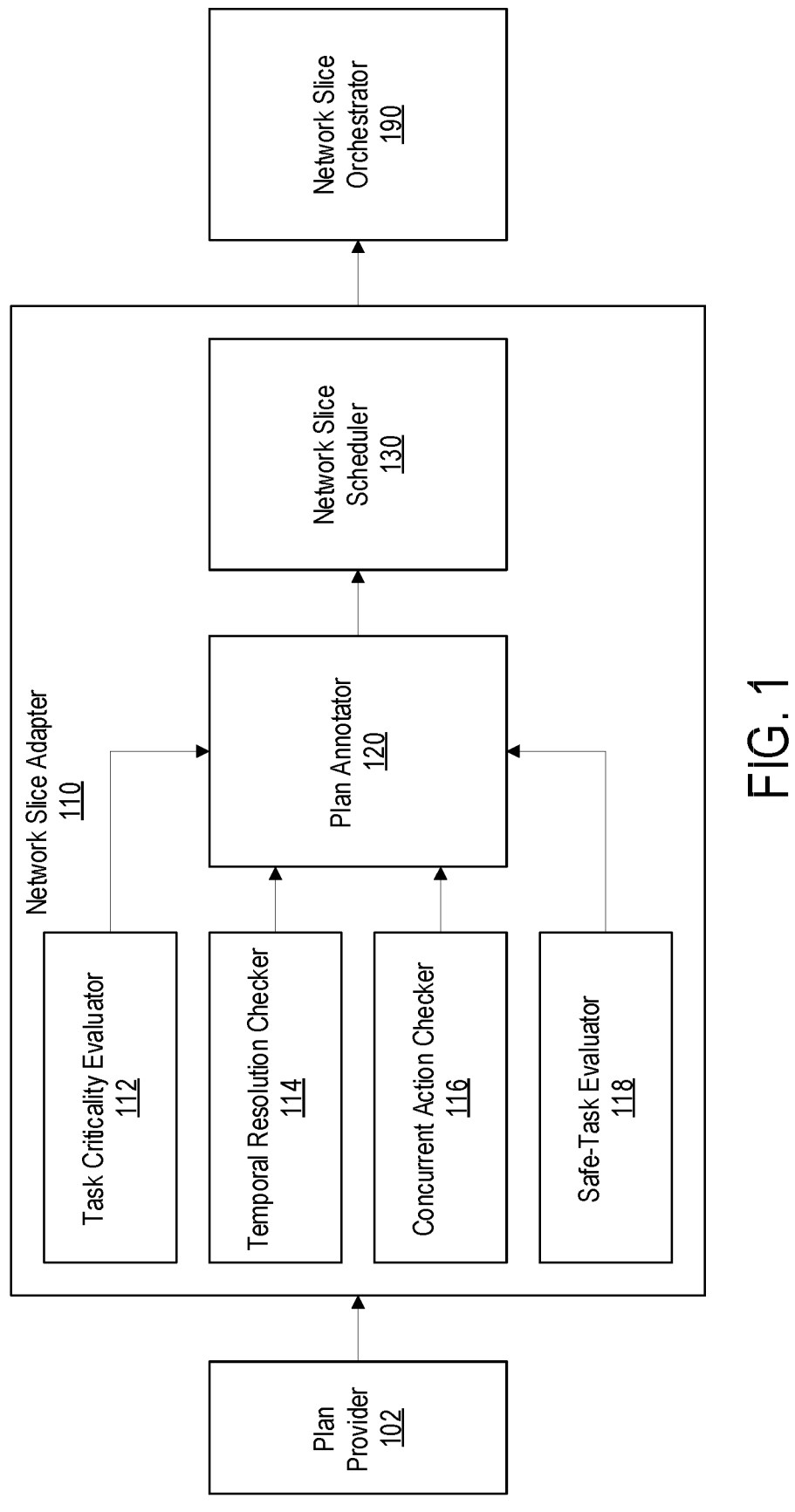
FIG. 1 is a bock diagram illustrating an example of a slice adapter in accordance with some embodiments.

FIG. 1 is a block diagram illustrating an example of a network slice adapter 110 coupled to a plan provider 102 and a slice orchestrator 190 (also referred to herein as a network slice orchestrator). In some embodiments, the network slice adapter 110 receives a plan from the plan provider 110. The plan includes a set of tasks (also referred to as actions) to be performed by one or more network nodes operating in a communication network. For example, the plan can include a set of tasks to be performed by a robot operating in a new radio ("NR") network of a smart factory. The network slice adapter 110 outputs a network slice schedule to the network slice orchestrator 190. In some embodiments, the network slice orchestrator 190 configures network slices to provide network resources to the one or more network nodes performing the tasks based on the network slice schedule.

The network slice adapter 110 includes a task criticality evaluator 112, a temporal resolution checker 114, a concurrent action checker 116, a safe-task evaluator 118, a plan annotator 120, and a slice scheduler 130 (also referred to herein as a network slice scheduler). In some embodiments, the task criticality evaluator 112 evaluates the tasks in the plan and determines network requirements for individual tasks in the plan based on a criticality of the individual tasks. The task criticality evaluator 112 provides the network requirement for individual tasks to the plan annotator 120. The temporal resolution checker 114 evaluates the tasks in the plan and determines network requirements for individual tasks in the plan based on a temporal resolution of the individual tasks. The temporal resolution checker 114 provides the network requirement for individual tasks to the plan annotator 120. The concurrent action checker 116 evaluates the tasks in the plan and determines which tasks are performed, at least partially, at the same time. For example, the concurrent action checker 116 can determine that a first robot is to move at the same time a second robot is charging. The concurrent action checker 116 provides concurrency information to the plan annotator 120. The safe-task evaluator 118 evaluates the tasks in the plan to determine network requirements for individual tasks based on a risk or safety level of the individual tasks. For example, a task that involves operation of a robot near a human may have higher network requirements (e.g., lower latency) based on the potential danger to humans than a task that involves a robot charging. The safe-task evaluator 118 provides the network requirements for the individual tasks to the plan annotator 120.

In some embodiments, the plan annotator 120 annotates the plan to indicate the network requirements and concurrency of each task in the plan based on the information provided by the task criticality evaluator 112, the temporal resolution checker 114, the concurrent action checker 116, and the safe-task evaluator 118. In some embodiments, additional information providers may provide information associated with the tasks to the plan annotator for generating the annotated plan. The plan annotator 120 provides the annotated plan to the network slice scheduler 130.

In some embodiments, the network slice scheduler 130 generates a network slice schedule based on the annotated plan. In additional or alternative embodiments, the network slice scheduler 130 receives the annotated plan, a network inventory indicating available network resources, an indication of costs (e.g., energy, time, or money) associated with the available network resources, and additional network constraints. In some examples, the network slice scheduler 130 generates the network slice schedule to minimize energy costs. In additional or alternative examples, the network slice scheduler 130 generates the network slice schedule to maximize performance (e.g., speed or accuracy). In additional or alternative embodiments, the network slice schedule includes network slice SLAs for different time intervals.

In some embodiments, generating the network slice schedule based on the network requirements for individual tasks in a plan generates a network slice schedule usable by the network slice orchestrator 190 to more accurately provision resources as needed at a finer granularity than based on a worst-case network requirement for all tasks in a plan.

Although FIG. 1 illustrates the plan annotator 120 and the network slice scheduler 130 being part of the network slice adapter 110, in some embodiments, a plan annotator and a network slice scheduler are separate and independent network nodes. In additional or alternative embodiments, the plan provider 102 includes a task criticality evaluator, a temporal resolution checker, a concurrent action checker, a safe-task evaluator, and a plan annotator and the plan provider provides an annotated plan to an independent slice scheduler. The annotated plan includes a set of tasks to be performed as well as information associated with each of the tasks. The information includes an indication of a criticality, a temporal resolution, concurrent tasks, and safety associated with each task. In additional or alternative embodiments, the network slice orchestrator 190 includes the network slice scheduler 130 and/or the network slice adapter 110.

FIG. 2 illustrates an example of a plan having multiple tasks to be performed by multiple network nodes. The plan is associated with operation of an automated warehouse, with multiple robots and drones performing pick-up and drop-off tasks. In this example, the plan includes an optimal sequence of tasks required for a robot and a drone performing a warehouse operation. The different tasks have an indication of a start time 210 (e.g., in seconds), indication of a type of action 220 (e.g., pickup, move, drop, precise-move, charge, take-image, and safety check), indication of a network node performing the task 230 (e.g., robot1, robot2, and drone 1), and an indication of the duration of the task 260 (e.g., in seconds).

In this example, at 12th second there is a conflict between the pickup and drop tasks of robot2 and robot1 respectively. In large multi-agent systems, conflicts may not be resolved at plan-time due to state space explosion. This conflict can be left for execution time, and in this example, involve collision checking and motion planning. These maneuvers can be safety critical and may require faster sampling frequencies of the sensors, actuators, and controllers. Thus, the network requirements in terms of latency can be more stringent. Accordingly, the network slice scheduler 130 may generate the network slice schedule to indicate that at the 12$^{th}$ second, both robot1 and robot2 are assigned a slice with an amount of network resources that is based on the increased safety concerns and critical SLA associated with the tasks.

In this example, between the 24$^{th}$ and 25.5$^{th}$ second, a precise-move action, which performs navigation within a waypoint region, is planned. A precise-move action has a smaller temporal resolution than other actions and requires faster control loops. Accordingly, network slice scheduler 130 may generate a network slice schedule that includes ensuring a slice associated with robot1 at the 24$^{th}$ second provides a latency below a threshold level based on the temporal resolution and faster control loop requirements.

In this example, between the 26$^{th}$ and 27$^{th}$ second, two actions (charge by robot1 and take-image by robot1) are planned to occur in parallel, which have different SLA requirements. The network slice scheduler 130 may determine the portion of the network slice schedule associated with this time interval based on the concurrent actions. For example, a network slice allocated for the take-image task may be merged with the charge task at the completion of the take-image task or the network slice allocated for the charge task may be configured to be able to provide network resources for both the charge and take-image task.

In this example, at the 38$^{th}$ second a safety-check is planned. A safety-check can require human collaboration, and therefore may be a safety critical operation. Safety-critical operations can be required to have a stringent latency requirements to sense and respond quickly to any unanticipated issues such as breaching safety distance.

Figure 3:
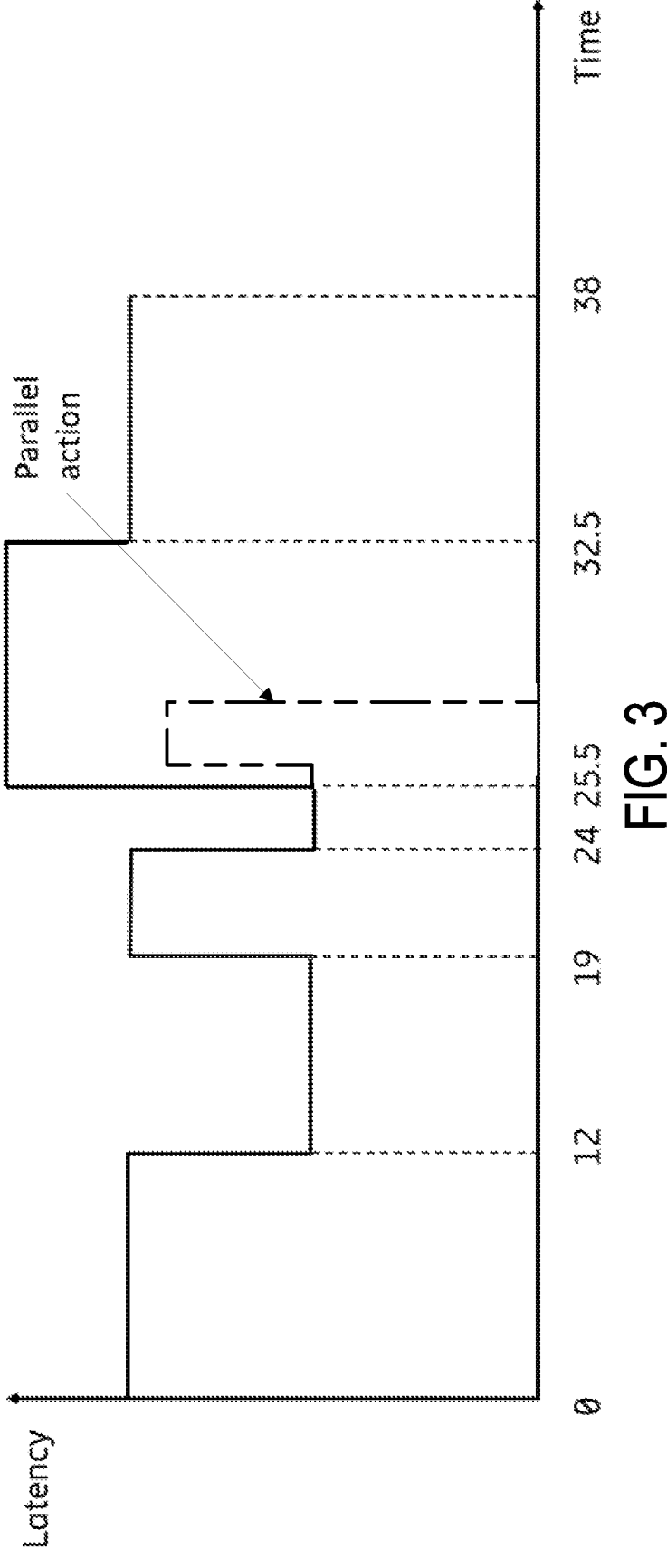
FIG. 3 is a graph illustrating an example of latency requirements for the plan of FIG. 2 in accordance with some embodiments.

In this example, apart from the tasks described above, the rest of the tasks may be considered routine and it may be a waste to allocate expensive resources that would guarantee small latencies/large bandwidth for the routine tasks. FIG. 3 is a chart illustrating an example of latency requirements for robot1 to perform the tasks of the plan illustrated in FIG. 2. Bandwidth can be similarly represented.

Various embodiments herein describe evaluating a set of tasks (e.g., a plan) and identifying the times at which special requirements on the network slice exist. In some embodiments, identifying these times at which special requirements on the network slice exist is performed by the task criticality evaluator 112, temporal resolution checker 114, concurrent action checker 116, and safe-task evaluator 118 of FIG. 1. These components are network-aware, since the notion of criticality can be different dependent on the network, for example, in a task with most actions requiring 100 ms latency, an action requiring 20 ms can be seen as critical. In a different task (e.g. ultra-reliable low-latency communication ("URLLC")) where most actions require 5 ms latency guarantees, a 1 ms latency action would be denoted as critical. In additional or alternative embodiments, the plan annotator 120, plan provider 110, or network slice scheduler 130 identifies the times at which special requirements on the slice exist.

Figures 4, 5:
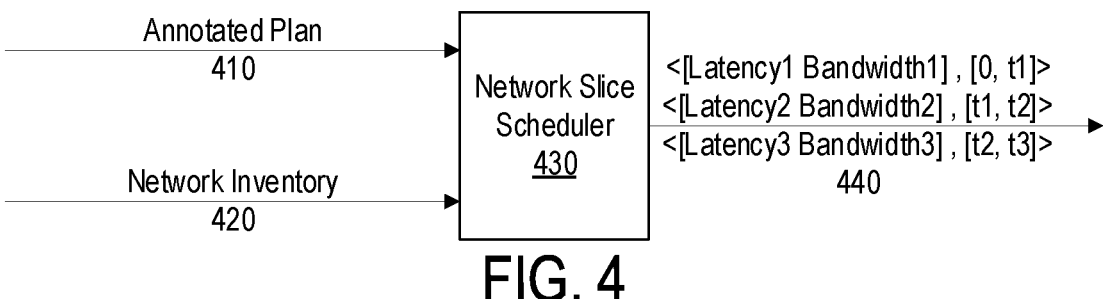
FIG. 4 is a block diagram illustrating an example of a slice scheduler in accordance with some embodiments.
FIG. 5 is a diagram illustrating an example of a tree that is generatable and searchable by a slice scheduler in accordance with some embodiments.

FIG. 4 illustrates an example of a network slice scheduler 430 that receives an annotated plan 410 and network inventory 420 and computes a network slice schedule 440 in terms of the network slice SLAs for different time windows. The annotated plan 410 includes the tasks to be performed and information about each task, for example, a criticality, temporal resolution, an indication of any tasks being performed concurrently, or safety of each task. The network inventory 420 includes the network resources available for allocation. The network slice schedule 440 includes a latency and bandwidth requirement for each time interval. The network slice schedule 440 is provided to a network slice orchestrator for configuring the network slices based on the slice schedule to provide the network resources that meet the latency and bandwidth requirements to the network nodes during the time intervals they are performing the tasks.

In some embodiments, the network slice scheduler takes into account that the cost of any change (e.g., reconfiguration of a network slice) has a corresponding trade-off cost of maintaining the SLA. For example, if li and bi represent the latency and bandwidth respectively at time instants i=0, . . . . T, $$a \text{ cost to minimize} = \Sigma_i J(li, \ bi) + \Sigma_j Cj, \ i=1 \ldots T, j=1, \ldots, N$$

where J is the cost of keeping the SLAs li, bi at time i. Cj represents each change in SLA. i.e. the cost of the changes, vs the cost of retaining the current slice is to be traded off. This could also be a weighted sum.

In additional or alternative embodiments, apart from the cost (which are associated with resources being held), the network slice scheduler determines the network slice schedule based on the time taken to reconfigure/change slices. For seamless task execution, there should not be any delays associated with slice changes. A safety constraint can be imposed such that any latency less than what is required is allowed, but that a higher latency than required is not allowed. To meet the latency requirements under these constraints, the choices available to the network slice scheduler can include: adding a new network slice; removing an existing network slice; reconfiguring the existing network slice; and merging existing network slices.

In some embodiments, the network slice scheduler receives as input the annotated plan and allocates one network slice per action with SLAs as per the requirements computed during annotation. The network slice scheduler iterates through the plan and reduces a number of network slice reconfigurations as long as the constraints are satisfied. For example, the network slice scheduler generates and searches a tree of possible slice actions, and the times, costs and constraints associated with the possible slice action (an example of a search tree is shown in FIG. 5). The network slice scheduler can obtain the information for this tree from the network inventory.

In additional or alternative embodiments, if a network slice already exists when a new action is planned to start, the network slice scheduler determines whether it is more efficient to maintain the existing network slice by reconfiguring/scaling it.

In additional or alternative embodiments, if two actions are planned to occur in parallel, the network slice scheduler determines whether the same network slice will suffice for both actions. If not, the network slice scheduler determines whether it is more efficient to scale an existing network slice to accommodate better resources and support both actions or add a new network slice.

In additional or alternative embodiments, if two network slices exist for actions planned to occur at least partially in parallel, and one of the actions is scheduled to complete prior the other action, the network slice scheduler determines to merge the two network slices (by rerouting resources from one of them and removing that network slice) once one of the actions is completed.

In additional or alternative embodiments, each network slice reconfiguration is associated with a time needed for reconfiguration, ±Δt. The network slice scheduler determines the network slice schedule based on the time needed for reconfiguration.

FIG. 5 illustrates an example of a network slice action tree. On the left the plan actions 530 are annotated. Here action1 occurs from time t=0 to t=30 seconds, while action2 occurs from t=15 to t=45s. At each level of the network slice action tree, the network slice actions 510 form the edges, which includes the cost of the action 520. In this case we illustrate with the monetary cost, but it could also be other cost functions such as energy. Further, some constraints may invalidate a choice. For example, a constraint may specify that we cannot reconfigure two slices in a given time window, which reduces some of the edges in a level of the network slice action tree.

In some embodiments, once the network slice action tree is generated by the network slice scheduler, the network slice scheduler searches for the minimum cost path through the network slice action tree. The resulting choices for each time window forms the network slice schedule.

In additional or alternative embodiments, the generated network slice schedule is input to a network slice orchestrator (e.g., wide area network orchestrator ("WANO")/ network functions virtualization orchestrator ("NFVO")), which can execute the reconfigurations at the correct times.

In some embodiments, a system and method are provided for scheduling network slice SLAs with task plans as input. Determining network slice scheduling based on individual tasks results in fine-grained scheduling and reduces a cost of communication compared to determining network slice scheduling based on a worst-case SLA for a set of tasks. In additional or alternative embodiments, the network slice scheduling takes into account both the cost of network slices to provide the task SLA's and the cost of transition between network slice structures. In additional or alternative embodiments, the variable network requirements of specific actions or set of actions enable the SLAs to be changed dynamically, such that cost and energy can be saved. Task plans can be generated in a goal-driven way using optimization techniques such as AI planning such that the task plans are far more flexible and state-dependent than workflows.

In some embodiments, a given plan is annotated by network-aware components such as a task criticality evaluator, a temporal resolution checker, a concurrent action checker and a safe-task evaluator. The annotated plan is taken as input by a network slice scheduler, which constructs a corresponding network slice action tree. The network slice scheduler generates a schedule for network slice SLAS, which can be consumed by existing network slice orchestrators.

Operations of a network node will now be discussed with reference to the flow charts of FIGS. 10-15 according to some embodiments of inventive concepts. FIGS. 10-15 will be described below as being performed by network slice scheduler 900 (implemented using the structure of the block diagram of FIG. 9). For example, modules may be stored in memory 905 of FIG. 9, and these modules may provide instructions so that when the instructions of a module are executed by respective network slice scheduler processing circuitry 903, processing circuitry 903 performs respective operations of the flow charts.

Figure 10:
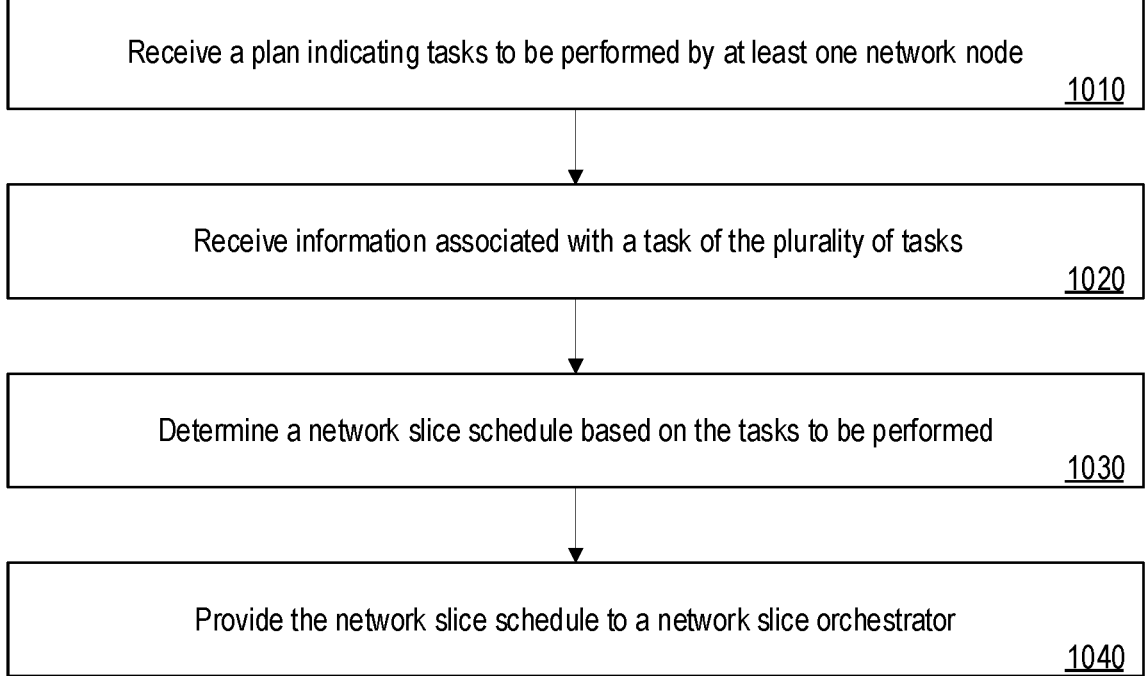

FIG. 10 is a flow chart illustrating an example of a process performed by a first network node (e.g., network slice scheduler 900) operating in a communication network to determine and provide a network slice schedule corresponding to a set of tasks to be performed by one or more second network nodes operating in the communication network.

At block 1010, processing circuitry 903 receives, via network interface 907, a plan indicating tasks to be performed by at least one second network node (e.g., terminal device 600) operating in the communication network (e.g., a new radio ("NR") network).

At block 1020, processing circuitry 903 receives, via network interface 907, information associated with a specific task of the tasks to be performed by the at least one second network node. In some embodiments, the information includes at least one of: a criticality of the specific task, a temporal resolution of the specific task, an indication of concurrent actions of the specific task, and a safety level of the specific task.

In additional or alternative embodiments, the plan is an annotated plan that includes both an indication of the tasks to be performed by the at least one second network node and the information associated with each task of the tasks.

At block 1030, processing circuitry 903 determines a network slice schedule based on the tasks to be performed by the at least one second node. In some embodiments, determining the network slice schedule includes determining a network slice configuration associated with a portion of the network slice schedule corresponding to the specific task based on the information. In additional or alternative embodiments, determining the network slice schedule includes determining, for multiple time intervals of the plan, whether to add a new network slice, remove a network slice, reconfigure an existing network slice, merge the existing network slice with another network slice, or maintain the existing network slice. Example processes for determining the network slice schedule are illustrated in FIGS. 11-15.

At block 1040, processing circuitry 903 provides the network slice schedule to a network slice orchestrator. In some embodiments, providing the network slice schedule to the network slice orchestrator includes transmitting the network slice schedule as an input to the network slice orchestrator to cause the network slice orchestrator to reconfigure variable slices of the communication network during completion of the plan. The network slice schedule can indicate when and how to reconfigure the variable network slices.

Various operations of FIG. 10 may be optional with respect to some embodiments of network nodes and related methods. Regarding method of example embodiment 1 (set forth below), for example, operations of block 1020 of FIG. 10 may be optional.

FIG. 11 is a flow chart illustrating an example of a process for determining the network slice schedule based on the tasks to be performed by the at least one second network node.

At block 1110, processing circuitry 903 determines a latency requirement and a bandwidth requirement associated with a first task of the tasks. The first task is indicated in the plan as being completed by a third network node of the at least one second network node. In some embodiments, the latency requirement and the bandwidth requirement are determined based on a portion of the information that is associated with the first task.

At block 1112, processing circuitry 903 determines a network resource allocation associated with performing the first task. In some embodiments, the network resource allocation is a minimum network resource allocation required for the third network node to complete the first task while meeting the latency requirement and the bandwidth requirement.

At block 1114, processing circuitry 903 determines that the network slice schedule includes an existing network slice associated with an earlier task. The earlier task is scheduled to be performed prior to the first task.

At block 1120, processing circuitry 903 determines a resource cost of reconfiguring an existing network slice to be a new network slice. In some embodiments, determining the resource cost of reconfiguring the existing network slice to be the new network slice includes determining an amount of time required to reconfigure the existing slice into the new network slice At block 1130, processing circuitry 903 determines a resource savings of using the new network slice during the first task rather than the existing network slice during the first task. In some embodiments, determining the resource savings of using the new network slice during the first task rather than the existing network slice during the first task includes determining a difference in network resource allocation between using the new slice during the first task and using the existing network slice during the first task.

At block 1135, processing circuitry 903 determines whether to reconfigure the existing network slice associated with the earlier task at a start of the first task to provide the network resource allocation to the third network node during performance of the first task based on the information. In some embodiments, determining whether to reconfiguring the existing network slice includes determining whether resource savings are greater than resource costs.

At block 1140, responsive to determining not to reconfigure the existing network slice, processing circuitry 903 determines to maintain the existing slice during the first task. In some embodiments, block 1140 is performed in response to processing circuitry 903 determining that the resource savings are not greater than the resource costs, At block 1150, responsive to determining to reconfigure the existing network slice, processing circuitry 903 determines to reconfigure the existing network slice into the new network slice. In some embodiments, block 1150 is performed in response to processing circuitry 903 determining that the resource savings are greater than the resource costs.

Figure 12:
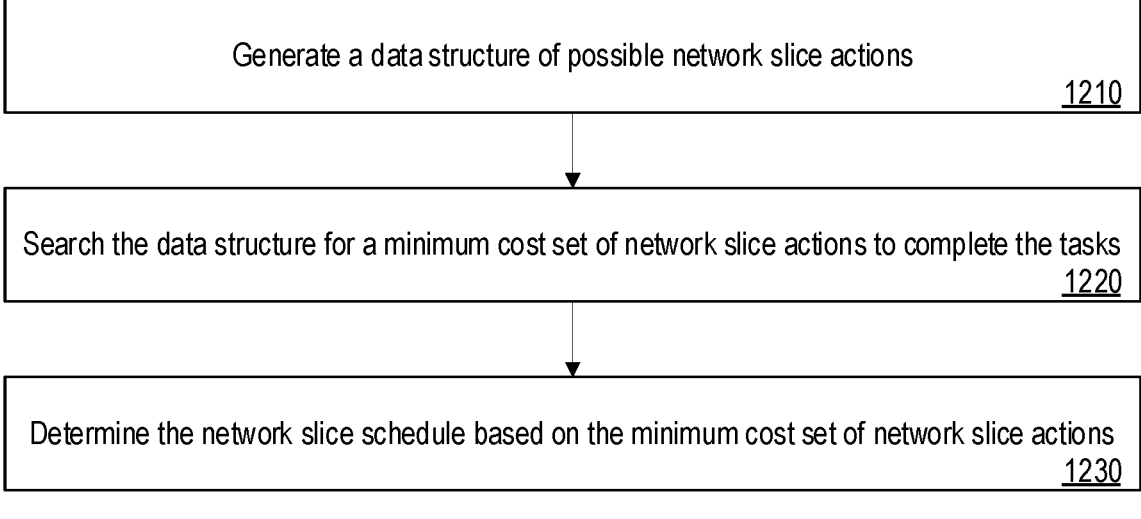

FIG. 12 is a flow chart illustrating another example of a process for determining the network slice schedule based on the tasks to be performed by the at least one second network node.

At block 1210, processing circuitry 903 generates a data structure of possible network slice actions. In some embodiments, the data structure is a tree structure having a branch for each possible network slice action. In additional or alternative embodiments, the network slice actions include at least one of reconfiguring an existing network slice, maintaining the existing network slice, removing the existing network slice, merging two existing network slices, and adding a new network slice. In additional or alternative embodiments, the data structure includes the possible network slice actions, times associated with the possible network slice actions, a resource cost of performing each of the possible network slice actions, and constraints associated with each task of the plurality of tasks.

At block 1220, processing circuitry 903 searches the data structure for a minimum cost set of network slice actions to complete the tasks while meeting any constraints associated with each task.

At block 1230, processing circuitry 903 determines the network slice schedule based on the minimum cost set of network slice actions.

Figure 13:
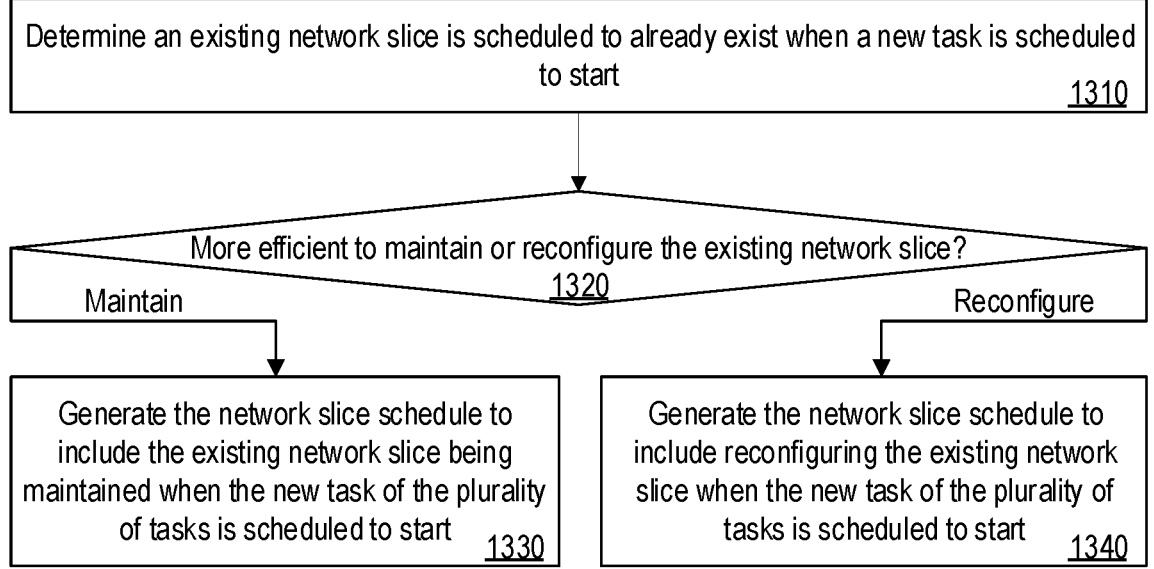

FIG. 13 is a flow chart illustrating another example of a process for determining the network slice schedule based on the tasks to be performed by the at least one second network node. At block 1310, processing circuitry 903 determines an existing network slice is scheduled to exist when a new task is scheduled to start. At block 1320, processing circuitry 903 determines whether it is more efficient to maintain the existing network slice or reconfigure the existing network slice into a new network slice. At block 1330, responsive to determining that it is more efficient to maintain the existing network slice, processing circuitry 903 generates the network slice schedule to include the existing network slice being maintained when the new task is scheduled to start. At block 1340, responsive to determining that it is more efficient to reconfigure the existing network slice, processing circuitry 903 generates the network slice schedule to include reconfiguring the existing network slice when the new task is scheduled to start.

FIG. 14 is a flow chart illustrating another example of a process for determining the network slice schedule based on the tasks to be performed by the at least one second network node. At block 1410, processing circuitry 903 determines that a portion of a first task and a portion of a second task are scheduled to occur at the same time. At block 1420, processing circuitry 903 determines that a single network slice will not meet requirements for completing both the first task and the second task. At block 1430, processing circuitry 903 determines whether it is more efficient to reconfigure the single network slice to meet the requirements for completing both the first task and the second task or add a new network slice. At block 1440, responsive to determining that it is more efficient to reconfigure the single network slice, processing circuitry 903 generates the network slice schedule to include reconfiguring the single network slice to provide sufficient resources to meet the requirements for completing both the first task and the second task when the first task or the second task is scheduled to start. At block 1450, responsive to determining that it is more efficient to add the new network slice, processing circuitry 903 generates the network slice schedule to include adding the new network slice when the first task or the second task is scheduled to start.

FIG. 15 is a flow chart illustrating another example of a process for determining the network slice schedule based on the tasks to be performed by the at least one second network node. At block 1510, processing circuitry 903 determines that a portion of a first task and a portion of a second task are scheduled to occur at the same time. At block 1520, processing circuitry 903 determines that the first task is scheduled to be completed prior to the second task. At block 1530, processing circuitry 903 generates the network slice schedule to include merging a first network slice associated with the first task with a second network slice associated with the second task when the first task is completed.

In some embodiments, processing circuitry 903 determines a network slice action is more efficient based on the network slice action resulting in a reduction in energy consumption, reduction in network resource consumption, reduction in cost, and/or an improvement in performance (e.g., faster or more accurate) of an associated task.

In additional or alternative embodiments, determining the network slice schedule based on the tasks to be performed by the at least one second network node includes using artificial intelligence ("AI") planning to autonomously derive a set of initial network slices and network slice reconfigurations to use to configure the communication network during completion of the tasks.

In additional or alternative embodiments, determining the network slice schedule based on the tasks to be performed by the at least one second network node includes determining a service level agreement ("SLA") for each task of the tasks, wherein a SLA of a first task of the tasks is different than a SLA of a second task of the tasks.

In additional or alternative embodiments, determining the network slice schedule based on the tasks to be performed by the at least one second network node includes determining at least one variable network slice associated with one or more tasks of the tasks, the at least one variable network slice being scheduled to be reconfigured during completion of the tasks.

Although operations of FIGS. 10-15 were described as being performed by network slice scheduler 900, other implementation are possible. In some embodiments, the operations of FIGS. 10-15 are performed by a network slice orchestrator that is further configured to allocate network resources among the at least one second network node during performance of the tasks based on the network slice schedule. In additional or alternative embodiments, operations of FIGS. 10-15 are performed by a network slice adapter.

Various operations of FIGS. 11-15 may be optional with respect to some embodiments of network nodes and related methods.

Example embodiments are discussed below.

Embodiment 1. A method of operating a first network node in a communication network, the method comprising:

receiving (1010) a plan indicating a plurality of tasks to be performed by at least one second network node operating in the communication network;

determining (1030) a network slice schedule based on the plurality of tasks to be performed by the at least one second network node operating in the communication network; and providing (1040) the network slice schedule to a network slice orchestrator operating in the communication network.

Embodiment 2. The method of Embodiment 1, further comprising:

receiving (1020) information associated with a task of the plurality of tasks, wherein determining the network slice schedule based on the plurality of tasks to be performed by the at least one second network node comprises determining a slice configuration associated with a portion of the network slice schedule corresponding to the task based on the information.

Embodiment 3. The method of any of Embodiments 1-2, where receiving the plan comprises receiving an annotated plan that comprises:

indication of the plurality of tasks to be performed by the at least one second network node operating in the communication network; and the information associated with each task of the plurality of tasks.

Embodiment 4. The method of any of Embodiments 2-3, wherein the information comprises at least one of: a criticality of the task, a temporal resolution of the task, an indication of concurrent actions of the task, and a safety level of the task.

Embodiment 5. The method of any of Embodiments 1-4, wherein determining the network slice schedule based on the plurality of tasks to be performed by the at least one second network node operating in the communication network comprises:

determining (1110) a latency requirement and a bandwidth requirement associated with a first task of the plurality of tasks to be performed by a third network node of the at least one second network node based on a portion of the information that is associated with the first task of the plurality of tasks;

determining (1112) a network resource allocation associated with performing the first task of the plurality of tasks based on the latency requirement and the bandwidth requirement;

determining (1114) that the network slice schedule comprises an existing slice associated with an earlier task of the plurality of tasks, the earlier task being scheduled to occur prior to the first task; and responsive to determining that the network slice schedule comprises the existing slice associated with the earlier task of the plurality of tasks, determining (1135) whether to reconfigure the existing slice associated with the earlier task of the plurality of tasks at a start of the first task to provide the network resource allocation to the third network node during performance of the first task based on the information.

Embodiment 6. The method of Embodiment 5, wherein determining whether to reconfigure the existing slice associated with the earlier task of the plurality of tasks comprises:

determining (1120) a resource cost of reconfiguring the existing slice to be a new slice;

determining (1130) a resource savings of using the new slice during the first task rather than the existing slice during the first task;

responsive to the resource cost of reconfiguring the existing slice to be new slice being greater than the resource savings of using the new slice, determining (1140) to maintain the existing slice during the first task; and responsive to the resource savings of using the new slice being greater than the resource cost of reconfiguring the existing slice to be new slice, determining (1150) to reconfigure the existing slice into the new slice.

Embodiment 7. The method of Embodiment 6, wherein determining the resource cost of reconfiguring the existing slice to be the new slice comprises determining an amount of time required to reconfigure the existing slice into the new slice, and wherein determining the resource savings of using the new slice during the first task rather than the existing slice during the first task comprises determining a difference in network resource allocation between using the new slice during the first task and using the existing slice during the first task.

Embodiment 8. The method of any of Embodiments 1-7, wherein determining the network slice schedule based on the plurality of tasks to be performed by the at least one second network node operating in the communication network comprises:

determining, for a plurality of time intervals, whether to add a new slice, remove an existing slice, reconfigure the existing slice, merge the existing slice with another slice, or maintain the existing slice.

Embodiment 9. The method of Embodiments 1-8, wherein determining the network slice schedule based on the plurality of tasks to be performed by the at least one second network node operating in the communication network further comprises:

generating (1210) a data structure of possible network slice actions, times associated with the possible network slice actions, resource cost of performing each of the possible network slice actions, and constraints associated with each task of the plurality of tasks, the possible network slice actions including at least one of:

reconfiguring an existing slice, maintaining the existing slice, removing an existing slice, merging existing slices, and adding a new slice;

search (1220) the data structure for a minimum cost set of the possible network slice actions to complete the plurality of tasks while meeting the constraints associated with each task of the plurality of tasks; and determining (1230) the network slice schedule based on the minimum cost set of the possible network slice actions.

Embodiment 10. The method of Embodiment 9, wherein the data structure is a tree structure.

Embodiment 11. The method of any of Embodiments 1-10, wherein determining the slice schedule based on the plurality of tasks to be performed by the at least one second network node operating in the communication network further comprises:

determining (1310) that an existing slice is scheduled to exist when a new task of the plurality of tasks is scheduled to start;

responsive to determining that the existing slice is scheduled to already exist when the new task of the plurality of tasks is scheduled to start, determining (1320) whether it is more efficient to maintain the slice or reconfigure the slice;

responsive to determining that it is more efficient to maintain the slice, generating (1330) the network slice schedule to include the slice being maintained when the new task of the plurality of tasks is scheduled to start; and responsive to determining that it is more efficient to reconfigure the slice, generating (1340) the network slice schedule to include reconfiguring the slice when the new task of the plurality of tasks is scheduled to start.

Embodiment 12. The method of any of Embodiments 1-11, wherein determining the network slice schedule based on the plurality of tasks to be performed by the at least one second network node operating in the communication network further comprises:

determining (1410) that a portion of a first task of the plurality of tasks and a portion of a second task of the plurality of tasks is scheduled to occur at the same time;

responsive to determining that the portion of the first task of the plurality of tasks and the portion of the second task of the plurality of tasks is scheduled to occur at the same time, determining (1420) that a single slice will not meet requirements for completing both the first task and the second task;

responsive to determining that the single slice will not meet the requirements for completing both the first task and the second task, determining (1430) whether it is more efficient to reconfigure the single slice to provide sufficient resources to meet the requirements for completing both the first task and the second task or more efficient to add a new slice;

responsive to determining that it is more efficient to reconfigure the single slice, generating (1440) the network slice schedule to include reconfiguring the single slice to provide sufficient resources to meet the requirements for completing both the first task and the second task when the first task or the second task is scheduled to start; and responsive to determining that it is more efficient to add the new slice, generating (1450) the network slice schedule to include adding the new slice when the first task or the second task is scheduled to start.

Embodiment 13. The method of any of Embodiments 1-12, wherein determining the network slice schedule based on the plurality of tasks to be performed by the at least one second network node operating in the communication network further comprises:

determining (1510) that a portion of a first task of the plurality of tasks and a portion of a second task of the plurality of tasks is scheduled to occur at the same time;

responsive to determining that the portion of the first task of the plurality of tasks and the portion of the second task of the plurality of tasks is scheduled to occur at the same time, determining (1520) that the first task is scheduled to be completed prior to the second task; and responsive to determining that the first task is scheduled to be completed prior to the second task, generating (1530) the network slice schedule to include merging a first slice associated with the first task with a second slice associated with the second task when the first task is be completed.

Embodiment 14. The method of any of Embodiments 11-13, wherein being more efficient comprises at least one of: using less energy, improving performance, using less network resources.

Embodiment 15. The method of any of Embodiments 1-14, wherein determining the network slice schedule based on the plurality of tasks to be performed by the at least one second network node operating in the communication network further comprises using artificial intelligence, AI, planning to autonomously derive a set of initial slices and slice reconfigurations to use to configure the communication network during completion of the plurality of tasks.

Embodiment 16. The method of any of Embodiments 1-15, wherein determining the network slice schedule based on the plurality of tasks to be performed by the at least one second network node operating in the communication network further comprises determining a service level agreement, SLA, for each task of the plurality of tasks, wherein a SLA of a first task of the plurality of tasks is different than a SLA of a second task of the plurality of tasks.

Embodiment 17. The method of any of Embodiments 1-16, wherein determining the network slice schedule based on the plurality of tasks to be performed by the at least one second network node operating in the communication network further comprises determining at least one variable slice associated with one or more tasks of the plurality of tasks, the at least one variable slice being scheduled to be reconfigured during completion of the plurality of tasks.

Embodiment 18. The method of any Embodiments 1-17, wherein the first network node is a network slice scheduler (900), the second network node is a terminal device, and the communication network is a new radio, NR, network.

Embodiment 19. The method of any of Embodiments 1-18, wherein providing the network slice schedule to the network slice orchestrator operating in the communication network comprises transmitting the network slice schedule as an input to the network slice orchestrator to cause the network slice orchestrator to reconfigure variable slices of the communication network during completion of the plan, the network slice schedule indicating when and how to reconfigure the variable slices.

Embodiment 20. The method of any of Embodiments 1-17, wherein the first network node is the network slice orchestrator and is configured to allocate network resources among the at least one second network node during performance of the plurality of tasks based on the network slice schedule.

Embodiment 21. A first network node (700, 900) operating in a communication network, the first network node comprising:

processing circuitry (703, 903); and memory (705, 905) coupled to the processing circuitry and having instructions stored therein that are executable by the processing circuitry to cause the first network node to perform operations, the operations comprising:

receiving (1010) a plan indicating a plurality of tasks to be performed by at least one second network node operating in the communication network;

determining (1030) a network slice schedule based on the plurality of tasks to be performed by the at least one second network node operating in the communication network; and providing (1040) the network slice schedule to a network slice orchestrator operating in the communication network.

Embodiment 22. The first network node of Embodiment 21, the operations further comprising any operations of Embodiments 2-20.

Embodiment 23. A first network node (700, 900) operating in a communication network adapted to perform operations, the operations comprising:

receiving (1010) a plan indicating a plurality of tasks to be performed by at least one second network node operating in the communication network;

determining (1030) a network slice schedule based on the plurality of tasks to be performed by the at least one second network node operating in the communication network; and providing (1040) the network slice schedule to a network slice orchestrator operating in the communication network.

Embodiment 24. The first network node of Embodiment 23, the operations further comprising any operations of Embodiments 2-20.

Embodiment 25. A computer program comprising program code to be executed by processing circuitry (703, 903) of a first network node (703, 900) operating in a communication network, whereby execution of the program code causes the first network node to perform operations, the operations comprising:

receiving (1010) a plan indicating a plurality of tasks to be performed by at least one second network node operating in the communication network;

determining (1030) a network slice schedule based on the plurality of tasks to be performed by the at least one second network node operating in the communication network; and providing (1040) the network slice schedule to a network slice orchestrator operating in the communication network.

Embodiment 26. The computer program of Embodiment 25, the operations further comprising any operations of Embodiments 2-20.

Embodiment 27. A computer program product comprising a non-transitory storage medium (705, 905) including program code to be executed by processing circuitry (703, 903) of a first network node (700, 900) operating in a communication network, whereby execution of the program code causes the first network node to perform operations, the operations comprising:

receiving (1010) a plan indicating a plurality of tasks to be performed by at least one second network node operating in the communication network;

determining (1030) a network slice schedule based on the plurality of tasks to be performed by the at least one second network node operating in the communication network; and providing (1040) the network slice schedule to a network slice orchestrator operating in the communication network.

Embodiment 28. The computer program product of Embodiment 27, the operations further comprising any operations of Embodiments 2-20.

Explanations for abbreviations from the above disclosure are provided below.

ABBREVIATION EXPLANATION

3GPP $3^{rd}$ Generation Partnership Project

5G $5^{th}$ Generation Wireless Systems

NG Next Generation

IoT Internet of Things

AKA Authentication and Key Agreement

UICC Universal Integrated Circuit Card

SA2 3GPP architecture working group

SA3 3GPP security group

UP User Plane

LTE Long Term Evolution (4th Generation Wireless System)

CP Control Plane

AS Access Stratum eNB Evolved Node B

UE User Equipment or End User Device

SMC Security Mode Command

RRC Radio Resource Control

PDCP Packet Data Convergence Protocol

RAN Radio Access Network

CN Core Network

PDU Packet Data Unit

DRB Data Radio Bearer

AN Access Network (R) AN Both 3GPP and non-3GPP Access Networks

NAS Network Access Stratum

AMF Access and Mobility Management Function

NF Network Function

UDM Unified Data Management

PCF Policy Control Function

DRB-IP Data Radio Bearer Integrity Protected

IE Information Element

QoS Quality of Service gNB Base Station in 5G

NEF Network Exposure Function

NWDAF Network Data Analytics Function

PCF Policy Control Function

UDM Unified Data Management

UPF User Plane Function

DL Downlink

UL Uplink

LLS Lower Layer Split

LLS-U Lower Layer Split User Plane

LLS-C Lower Layer Split Control Plane

LLS-CU Lower Layer Split Central Unit

PHY Physical Layer

MP Management Plane

SSM Synchronization Status Message

TRX Transceiver

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 16:
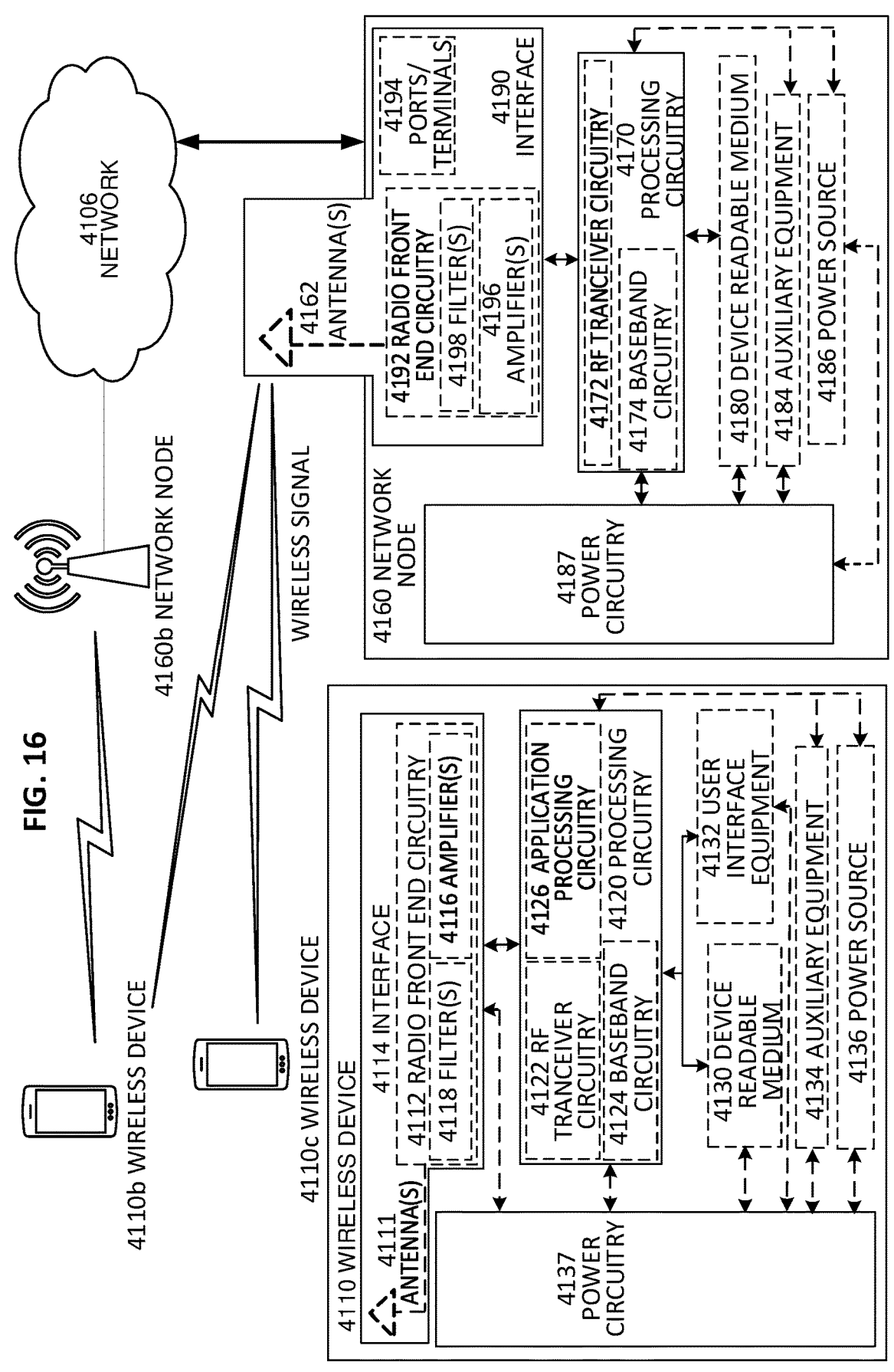
FIG. 16 is a block diagram of a wireless network in accordance with some embodiments.

FIG. 16 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 16. For simplicity, the wireless network of FIG. 16 only depicts network 4106, network nodes 4160 and 4160*b*, and WDs 4110, 4110*b*, and 4110*c* (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 4160 and wireless device (WD) 4110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 4106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 4160 and WD 4110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 16, network node 4160 includes processing circuitry 4170, device readable medium 4180, interface 4190, auxiliary equipment 4184, power source 4186, power circuitry 4187, and antenna 4162. Although network node 4160 illustrated in the example wireless network of FIG. 16 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 4160 are depicted as single boxes located within a larger box, or nested within multiple boxes, in practice, a network node may comprise multiple different physical components that make up a single illustrated component (e.g., device readable medium 4180 may comprise multiple separate hard drives as well as multiple RAM modules).

Similarly, network node 4160 may be composed of multiple physically separate components (e.g., a NodeB component and a RNC component, or a BTS component and a BSC component, etc.), which may each have their own respective components. In certain scenarios in which network node 4160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 4160 may be configured to support multiple radio access technologies (RATs). In such embodiments, some components may be duplicated (e.g., separate device readable medium 4180 for the different RATs) and some components may be reused (e.g., the same antenna 4162 may be shared by the RATs). Network node 4160 may also include multiple sets of the various illustrated components for different wireless technologies integrated into network node 4160, such as, for example, GSM, WCDMA, LTE, NR, WiFi, or Bluetooth wireless technologies. These wireless technologies may be integrated into the same or different chip or set of chips and other components within network node 4160.

Processing circuitry 4170 is configured to perform any determining, calculating, or similar operations (e.g., certain obtaining operations) described herein as being provided by a network node. These operations performed by processing circuitry 4170 may include processing information obtained by processing circuitry 4170 by, for example, converting the obtained information into other information, comparing the obtained information or converted information to information stored in the network node, and/or performing one or more operations based on the obtained information or converted information, and as a result of said processing making a determination.

Processing circuitry 4170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 4160 components, such as device readable medium 4180, network node 4160 functionality. For example, processing circuitry 4170 may execute instructions stored in device readable medium 4180 or in memory within processing circuitry 4170. Such functionality may include providing any of the various wireless features, functions, or benefits discussed herein. In some embodiments, processing circuitry 4170 may include a system on a chip (SOC).

In some embodiments, processing circuitry 4170 may include one or more of radio frequency (RF) transceiver circuitry 4172 and baseband processing circuitry 4174. In some embodiments, radio frequency (RF) transceiver circuitry 4172 and baseband processing circuitry 4174 may be on separate chips (or sets of chips), boards, or units, such as radio units and digital units. In alternative embodiments, part or all of RF transceiver circuitry 4172 and baseband processing circuitry 4174 may be on the same chip or set of chips, boards, or units In certain embodiments, some or all of the functionality described herein as being provided by a network node, base station, eNB or other such network device may be performed by processing circuitry 4170 executing instructions stored on device readable medium 4180 or memory within processing circuitry 4170. In alternative embodiments, some or all of the functionality may be provided by processing circuitry 4170 without executing instructions stored on a separate or discrete device readable medium, such as in a hard-wired manner. In any of those embodiments, whether executing instructions stored on a device readable storage medium or not, processing circuitry 4170 can be configured to perform the described functionality. The benefits provided by such functionality are not limited to processing circuitry 4170 alone or to other components of network node 4160, but are enjoyed by network node 4160 as a whole, and/or by end users and the wireless network generally.

Device readable medium 4180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 4170. Device readable medium 4180 may store any suitable instructions, data or information, including a computer program, software, an application including one or more of logic, rules, code, tables, etc. and/or other instructions capable of being executed by processing circuitry 4170 and, utilized by network node 4160. Device readable medium 4180 may be used to store any calculations made by processing circuitry 4170 and/or any data received via interface 4190. In some embodiments, processing circuitry 4170 and device readable medium 4180 may be considered to be integrated.

Interface 4190 is used in the wired or wireless communication of signalling and/or data between network node 4160, network 4106, and/or WDs 4110. As illustrated, interface 4190 comprises port(s)/terminal(s) 4194 to send and receive data, for example to and from network 4106 over a wired connection. Interface 4190 also includes radio front end circuitry 4192 that may be coupled to, or in certain embodiments a part of, antenna 4162. Radio front end circuitry 4192 comprises filters 4198 and amplifiers 4196. Radio front end circuitry 4192 may be connected to antenna 4162 and processing circuitry 4170. Radio front end circuitry may be configured to condition signals communicated between antenna 4162 and processing circuitry 4170. Radio front end circuitry 4192 may receive digital data that is to be sent out to other network nodes or WDs via a wireless connection. Radio front end circuitry 4192 may convert the digital data into a radio signal having the appropriate channel and bandwidth parameters using a combination of filters 4198 and/or amplifiers 4196. The radio signal may then be transmitted via antenna 4162. Similarly, when receiving data, antenna 4162 may collect radio signals which are then converted into digital data by radio front end circuitry 4192. The digital data may be passed to processing circuitry 4170. In other embodiments, the interface may comprise different components and/or different combinations of components.

In certain alternative embodiments, network node 4160 may not include separate radio front end circuitry 4192, instead, processing circuitry 4170 may comprise radio front end circuitry and may be connected to antenna 4162 without separate radio front end circuitry 4192. Similarly, in some embodiments, all or some of RF transceiver circuitry 4172 may be considered a part of interface 4190. In still other embodiments, interface 4190 may include one or more ports or terminals 4194, radio front end circuitry 4192, and RF transceiver circuitry 4172, as part of a radio unit (not shown), and interface 4190 may communicate with base-band processing circuitry 4174, which is part of a digital unit (not shown).

Antenna 4162 may include one or more antennas, or antenna arrays, configured to send and/or receive wireless signals. Antenna 4162 may be coupled to radio front end circuitry 4192 and may be any type of antenna capable of transmitting and receiving data and/or signals wirelessly. In some embodiments, antenna 4162 may comprise one or more omni-directional, sector or panel antennas operable to transmit/receive radio signals between, for example, 2 GHZ and 66 GHZ. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 4162 may be separate from network node 4160 and may be connectable to network node 4160 through an interface or port.

Antenna 4162, interface 4190, and/or processing circuitry 4170 may be configured to perform any receiving operations and/or certain obtaining operations described herein as being performed by a network node. Any information, data and/or signals may be received from a wireless device, another network node and/or any other network equipment. Similarly, antenna 4162, interface 4190, and/or processing circuitry 4170 may be configured to perform any transmitting operations described herein as being performed by a network node. Any information, data and/or signals may be transmitted to a wireless device, another network node and/or any other network equipment.

Power circuitry 4187 may comprise, or be coupled to, power management circuitry and is configured to supply the components of network node 4160 with power for performing the functionality described herein. Power circuitry 4187 may receive power from power source 4186. Power source 4186 and/or power circuitry 4187 may be configured to provide power to the various components of network node 4160 in a form suitable for the respective components (e.g., at a voltage and current level needed for each respective component). Power source 4186 may either be included in, or external to, power circuitry 4187 and/or network node 4160. For example, network node 4160 may be connectable to an external power source (e.g., an electricity outlet) via an input circuitry or interface such as an electrical cable, whereby the external power source supplies power to power circuitry 4187. As a further example, power source 4186 may comprise a source of power in the form of a battery or battery pack which is connected to, or integrated in, power circuitry 4187. The battery may provide backup power should the external power source fail. Other types of power sources, such as photovoltaic devices, may also be used.

Alternative embodiments of network node 4160 may include additional components beyond those shown in FIG. 16 that may be responsible for providing certain aspects of the network node's functionality, including any of the functionality described herein and/or any functionality necessary to support the subject matter described herein. For example, network node 4160 may include user interface equipment to allow input of information into network node 4160 and to allow output of information from network node 4160. This may allow a user to perform diagnostic, maintenance, repair, and other administrative functions for network node 4160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VOIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 4110 includes antenna 4111, interface 4114, processing circuitry 4120, device readable medium 4130, user interface equipment 4132, auxiliary equipment 4134, power source 4136 and power circuitry 4137. WD 4110 may include multiple sets of one or more of the illustrated components for different wireless technologies supported by WD 4110, such as, for example, GSM, WCDMA, LTE, NR, WiFi, WiMAX, or Bluetooth wireless technologies, just to mention a few. These wireless technologies may be integrated into the same or different chips or set of chips as other components within WD 4110.

Antenna 4111 may include one or more antennas or antenna arrays, configured to send and/or receive wireless signals, and is connected to interface 4114. In certain alternative embodiments, antenna 4111 may be separate from WD 4110 and be connectable to WD 4110 through an interface or port. Antenna 4111, interface 4114, and/or processing circuitry 4120 may be configured to perform any receiving or transmitting operations described herein as being performed by a WD. Any information, data and/or signals may be received from a network node and/or another WD. In some embodiments, radio front end circuitry and/or antenna 4111 may be considered an interface.

As illustrated, interface 4114 comprises radio front end circuitry 4112 and antenna 4111. Radio front end circuitry 4112 comprise one or more filters 4118 and amplifiers 4116. Radio front end circuitry 4112 is connected to antenna 4111 and processing circuitry 4120, and is configured to condition signals communicated between antenna 4111 and processing circuitry 4120. Radio front end circuitry 4112 may be coupled to or a part of antenna 4111. In some embodiments, WD 4110 may not include separate radio front end circuitry 4112; rather, processing circuitry 4120 may comprise radio front end circuitry and may be connected to antenna 4111. Similarly, in some embodiments, some or all of RF transceiver circuitry 4122 may be considered a part of interface 4114. Radio front end circuitry 4112 may receive digital data that is to be sent out to other network nodes or WDs via a wireless connection. Radio front end circuitry 4112 may convert the digital data into a radio signal having the appropriate channel and bandwidth parameters using a combination of filters 4118 and/or amplifiers 4116. The radio signal may then be transmitted via antenna 4111. Similarly, when receiving data, antenna 4111 may collect radio signals which are then converted into digital data by radio front end circuitry 4112. The digital data may be passed to processing circuitry 4120. In other embodiments, the interface may comprise different components and/or different combinations of components.

Processing circuitry 4120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 4110 components, such as device readable medium 4130, WD 4110 functionality. Such functionality may include providing any of the various wireless features or benefits discussed herein. For example, processing circuitry 4120 may execute instructions stored in device readable medium 4130 or in memory within processing circuitry 4120 to provide the functionality disclosed herein.

As illustrated, processing circuitry 4120 includes one or more of RF transceiver circuitry 4122, baseband processing circuitry 4124, and application processing circuitry 4126. In other embodiments, the processing circuitry may comprise different components and/or different combinations of components. In certain embodiments processing circuitry 4120 of WD 4110 may comprise a SOC. In some embodiments, RF transceiver circuitry 4122, baseband processing circuitry 4124, and application processing circuitry 4126 may be on separate chips or sets of chips. In alternative embodiments, part or all of baseband processing circuitry 4124 and application processing circuitry 4126 may be combined into one chip or set of chips, and RF transceiver circuitry 4122 may be on a separate chip or set of chips. In still alternative embodiments, part or all of RF transceiver circuitry 4122 and baseband processing circuitry 4124 may be on the same chip or set of chips, and application processing circuitry 4126 may be on a separate chip or set of chips. In yet other alternative embodiments, part or all of RF transceiver circuitry 4122, baseband processing circuitry 4124, and application processing circuitry 4126 may be combined in the same chip or set of chips. In some embodiments, RF transceiver circuitry 4122 may be a part of interface 4114. RF transceiver circuitry 4122 may condition RF signals for processing circuitry 4120.

In certain embodiments, some or all of the functionality described herein as being performed by a WD may be provided by processing circuitry 4120 executing instructions stored on device readable medium 4130, which in certain embodiments may be a computer-readable storage medium. In alternative embodiments, some or all of the functionality may be provided by processing circuitry 4120 without executing instructions stored on a separate or discrete device readable storage medium, such as in a hard-wired manner. In any of those particular embodiments, whether executing instructions stored on a device readable storage medium or not, processing circuitry 4120 can be configured to perform the described functionality. The benefits provided by such functionality are not limited to processing circuitry 4120 alone or to other components of WD 4110, but are enjoyed by WD 4110 as a whole, and/or by end users and the wireless network generally.

Processing circuitry 4120 may be configured to perform any determining, calculating, or similar operations (e.g., certain obtaining operations) described herein as being performed by a WD. These operations, as performed by processing circuitry 4120, may include processing information obtained by processing circuitry 4120 by, for example, converting the obtained information into other information, comparing the obtained information or converted information to information stored by WD 4110, and/or performing one or more operations based on the obtained information or converted information, and as a result of said processing making a determination.

Device readable medium 4130 may be operable to store a computer program, software, an application including one or more of logic, rules, code, tables, etc. and/or other instructions capable of being executed by processing circuitry 4120. Device readable medium 4130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 4120. In some embodiments, processing circuitry 4120 and device readable medium 4130 may be considered to be integrated.

User interface equipment 4132 may provide components that allow for a human user to interact with WD 4110. Such interaction may be of many forms, such as visual, audial, tactile, etc. User interface equipment 4132 may be operable to produce output to the user and to allow the user to provide input to WD 4110. The type of interaction may vary depending on the type of user interface equipment 4132 installed in WD 4110. For example, if WD 4110 is a smart phone, the interaction may be via a touch screen; if WD 4110 is a smart meter, the interaction may be through a screen that provides usage (e.g., the number of gallons used) or a speaker that provides an audible alert (e.g., if smoke is detected). User interface equipment 4132 may include input interfaces, devices and circuits, and output interfaces, devices and circuits. User interface equipment 4132 is configured to allow input of information into WD 4110, and is connected to processing circuitry 4120 to allow processing circuitry 4120 to process the input information. User interface equipment 4132 may include, for example, a microphone, a proximity or other sensor, keys/buttons, a touch display, one or more cameras, a USB port, or other input circuitry. User interface equipment 4132 is also configured to allow output of information from WD 4110, and to allow processing circuitry 4120 to output information from WD 4110. User interface equipment 4132 may include, for example, a speaker, a display, vibrating circuitry, a USB port, a headphone interface, or other output circuitry. Using one or more input and output interfaces, devices, and circuits, of user interface equipment 4132, WD 4110 may communicate with end users and/or the wireless network, and allow them to benefit from the functionality described herein.

Auxiliary equipment 4134 is operable to provide more specific functionality which may not be generally performed by WDs. This may comprise specialized sensors for doing measurements for various purposes, interfaces for additional types of communication such as wired communications etc. The inclusion and type of components of auxiliary equipment 4134 may vary depending on the embodiment and/or scenario.

Power source 4136 may, in some embodiments, be in the form of a battery or battery pack. Other types of power sources, such as an external power source (e.g., an electricity outlet), photovoltaic devices or power cells, may also be used. WD 4110 may further comprise power circuitry 4137 for delivering power from power source 4136 to the various parts of WD 4110 which need power from power source 4136 to carry out any functionality described or indicated herein. Power circuitry 4137 may in certain embodiments comprise power management circuitry. Power circuitry 4137 may additionally or alternatively be operable to receive power from an external power source; in which case WD 4110 may be connectable to the external power source (such as an electricity outlet) via input circuitry or an interface such as an electrical power cable. Power circuitry 4137 may also in certain embodiments be operable to deliver power from an external power source to power source 4136. This may be, for example, for the charging of power source 4136. Power circuitry 4137 may perform any formatting, converting, or other modification to the power from power source 4136 to make the power suitable for the respective components of WD 4110 to which power is supplied.

Figure 17:
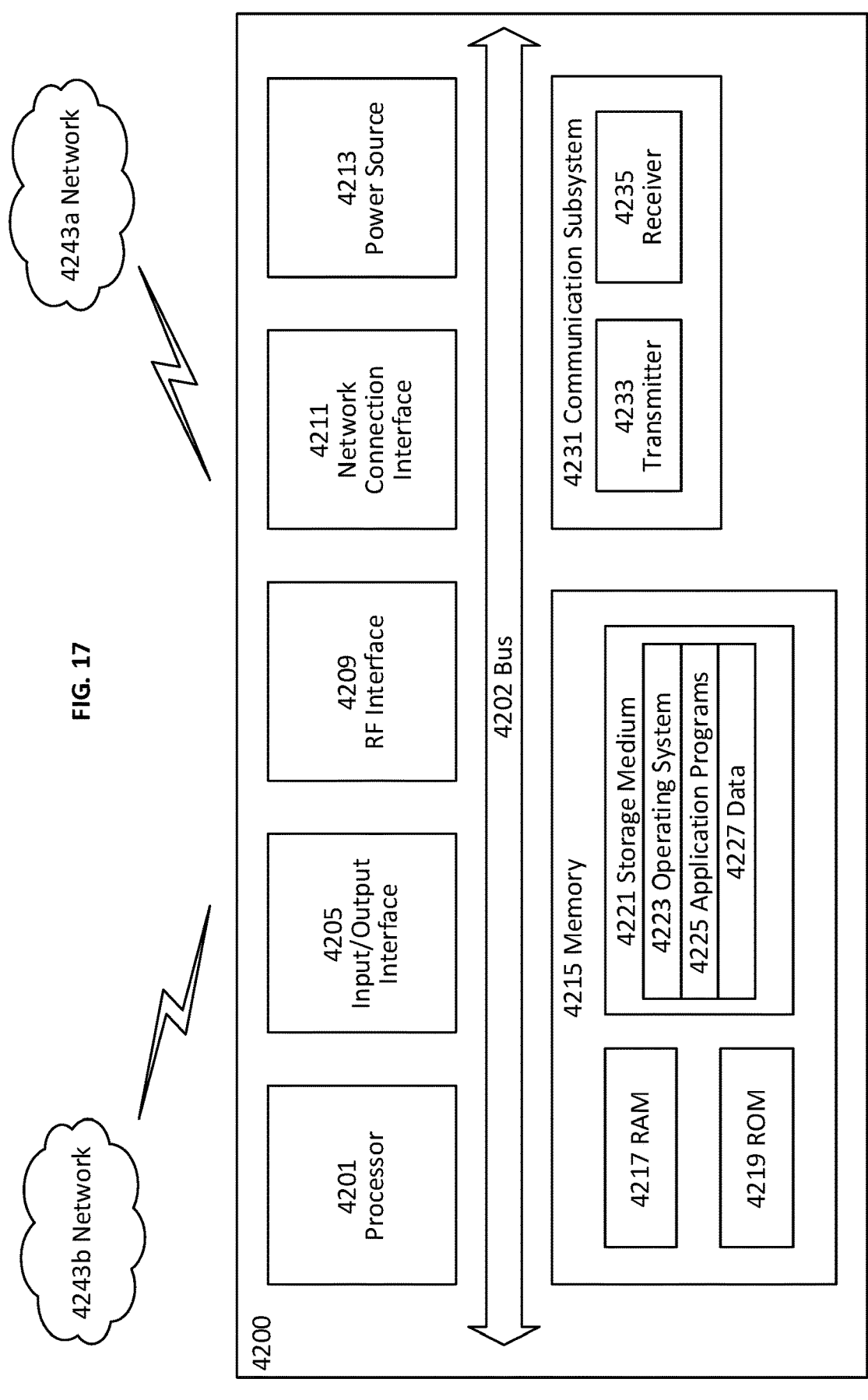
FIG. 17 is a block diagram of a user equipment in accordance with some embodiments

FIG. 17 illustrates a user Equipment in accordance with some embodiments.

FIG. 17 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 42200 may be any UE identified by the 3rd Generation Partnership Project (3GPP), including a NB-IoT UE, a machine type communication (MTC) UE, and/or an enhanced MTC (eMTC) UE. UE 4200, as illustrated in FIG. 17, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 17 is a UE, the components discussed herein are equally applicable to a WD, and vice-versa.

In FIG. 17, UE 4200 includes processing circuitry 4201 that is operatively coupled to input/output interface 4205, radio frequency (RF) interface 4209, network connection interface 4211, memory 4215 including random access memory (RAM) 4217, read-only memory (ROM) 4219, and storage medium 4221 or the like, communication subsystem 4231, power source 4213, and/or any other component, or any combination thereof. Storage medium 4221 includes operating system 4223, application program 4225, and data 4227. In other embodiments, storage medium 4221 may include other similar types of information. Certain UEs may utilize all of the components shown in FIG. 17, or only a subset of the components. The level of integration between the components may vary from one UE to another UE. Further, certain UEs may contain multiple instances of a component, such as multiple processors, memories, transceivers, transmitters, receivers, etc.

In FIG. 17, processing circuitry 4201 may be configured to process computer instructions and data. Processing circuitry 4201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 4201 may include two central processing units (CPUs). Data may be information in a form suitable for use by a computer.

In the depicted embodiment, input/output interface 4205 may be configured to provide a communication interface to an input device, output device, or input and output device. UE 4200 may be configured to use an output device via input/output interface 4205. An output device may use the same type of interface port as an input device. For example, a USB port may be used to provide input to and output from UE 4200. The output device may be a speaker, a sound card, a video card, a display, a monitor, a printer, an actuator, an emitter, a smartcard, another output device, or any combination thereof. UE 4200 may be configured to use an input device via input/output interface 4205 to allow a user to capture information into UE 4200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 17, RF interface 4209 may be configured to provide a communication interface to RF components such as a transmitter, a receiver, and an antenna. Network connection interface 4211 may be configured to provide a communication interface to network 4243*a*. Network 4243*a* may encompass wired and/or wireless networks such as a local-area network (LAN), a wide-area network (WAN), a computer network, a wireless network, a telecommunications network, another like network or any combination thereof. For example, network 4243*a* may comprise a Wi-Fi network. Network connection interface 4211 may be configured to include a receiver and a transmitter interface used to communicate with one or more other devices over a communication network according to one or more communication protocols, such as Ethernet, TCP/IP, SONET, ATM, or the like. Network connection interface 4211 may implement receiver and transmitter functionality appropriate to the communication network links (e.g., optical, electrical, and the like). The transmitter and receiver functions may share circuit components, software or firmware, or alternatively may be implemented separately.

RAM 4217 may be configured to interface via bus 4202 to processing circuitry 4201 to provide storage or caching of data or computer instructions during the execution of software programs such as the operating system, application programs, and device drivers. ROM 4219 may be configured to provide computer instructions or data to processing circuitry 4201. For example, ROM 4219 may be configured to store invariant low-level system code or data for basic system functions such as basic input and output (I/O), startup, or reception of keystrokes from a keyboard that are stored in a non-volatile memory. Storage medium 4221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 4221 may be configured to include operating system 4223, application program 4225 such as a web browser application, a widget or gadget engine or another application, and data file 4227. Storage medium 4221 may store, for use by UE 4200, any of a variety of various operating systems or combinations of operating systems.

Storage medium 4221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 4221 may allow UE 4200 to access computer-executable instructions, application programs or the like, stored on transitory or non-transitory memory media, to off-load data, or to upload data. An article of manufacture, such as one utilizing a communication system may be tangibly embodied in storage medium 4221, which may comprise a device readable medium.

In FIG. 17, processing circuitry 4201 may be configured to communicate with network 4243*b* using communication subsystem 4231. Network 4243*a* and network 4243*b* may be the same network or networks or different network or networks. Communication subsystem 4231 may be configured to include one or more transceivers used to communicate with network 4243*b*. For example, communication subsystem 4231 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 4233 and/or receiver 4235 to implement transmitter or receiver functionality, respectively, appropriate to the RAN links (e.g., frequency allocations and the like). Further, transmitter 4233 and receiver 4235 of each transceiver may share circuit components, software or firmware, or alternatively may be implemented separately.

In the illustrated embodiment, the communication functions of communication subsystem 4231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 4231 may include cellular communication, Wi-Fi communication, Bluetooth communication, and GPS communication. Network 4243*b* may encompass wired and/or wireless networks such as a local-area network (LAN), a wide-area network (WAN), a computer network, a wireless network, a telecommunications network, another like network or any combination thereof. For example, network 4243*b* may be a cellular network, a Wi-Fi network, and/or a near-field network. Power source 4213 may be configured to provide alternating current (AC) or direct current (DC) power to components of UE 4200.

The features, benefits and/or functions described herein may be implemented in one of the components of UE 4200 or partitioned across multiple components of UE 4200. Further, the features, benefits, and/or functions described herein may be implemented in any combination of hardware, software or firmware. In one example, communication subsystem 4231 may be configured to include any of the components described herein. Further, processing circuitry 4201 may be configured to communicate with any of such components over bus 4202. In another example, any of such components may be represented by program instructions stored in memory that when executed by processing circuitry 4201 perform the corresponding functions described herein. In another example, the functionality of any of such components may be partitioned between processing circuitry 4201 and communication subsystem 4231. In another example, the non-computationally intensive functions of any of such components may be implemented in software or firmware and the computationally intensive functions may be implemented in hardware.

Figure 18:
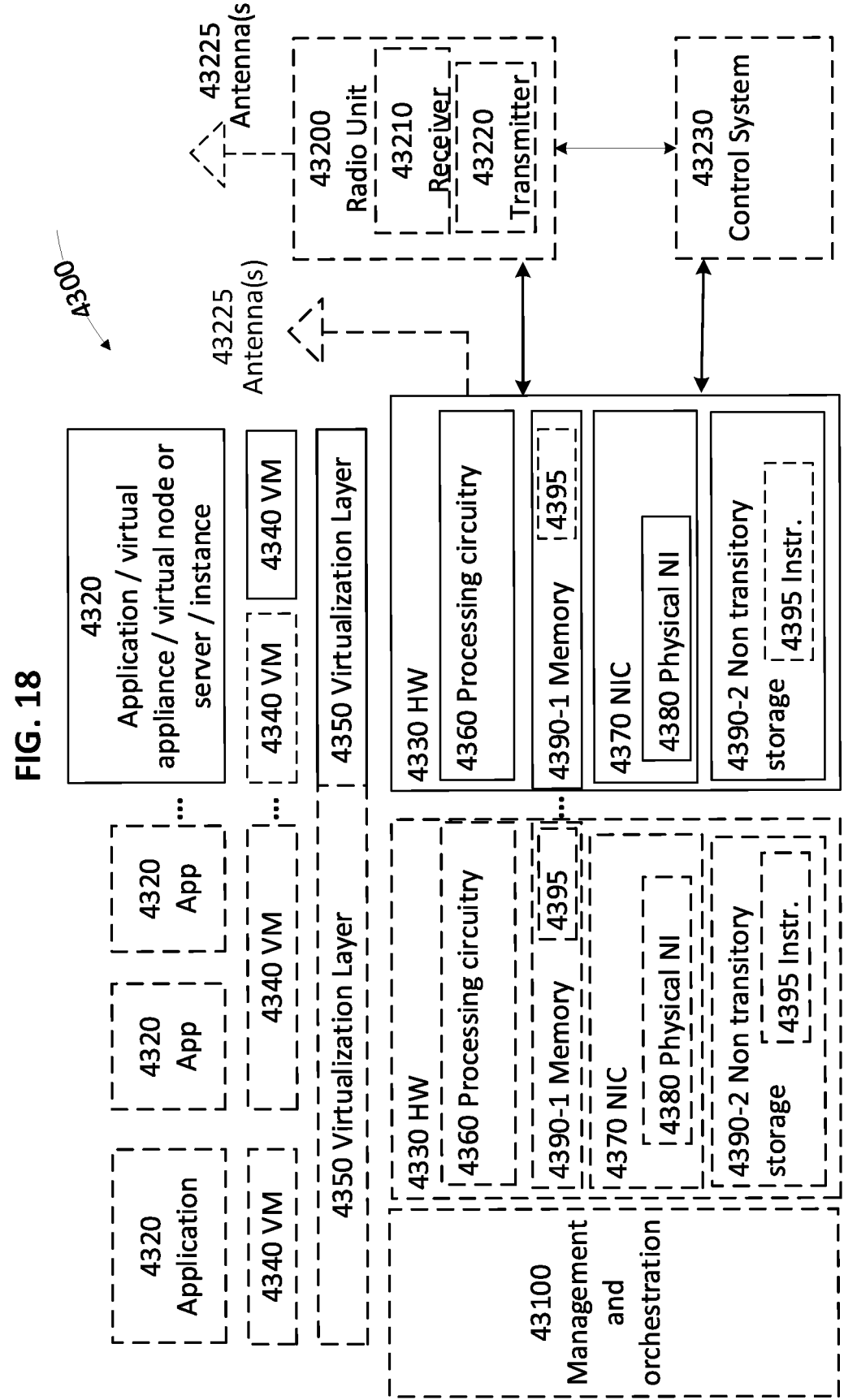
FIG. 18 is a block diagram of a virtualization environment in accordance with some embodiments.

FIG. 18 illustrates a virtualization environment in accordance with some embodiments.

FIG. 18 is a schematic block diagram illustrating a virtualization environment 4300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 4300 hosted by one or more of hardware nodes 4330. Further, in embodiments in which the virtual node is not a radio access node or does not require radio connectivity (e.g., a core network node), then the network node may be entirely virtualized.

The functions may be implemented by one or more applications 4320 (which may alternatively be called software instances, virtual appliances, network functions, virtual nodes, virtual network functions, etc.) operative to implement some of the features, functions, and/or benefits of some of the embodiments disclosed herein. Applications 4320 are run in virtualization environment 4300 which provides hardware 4330 comprising processing circuitry 4360 and memory 4390. Memory 4390 contains instructions 4395 executable by processing circuitry 4360 whereby application 4320 is operative to provide one or more of the features, benefits, and/or functions disclosed herein.

Virtualization environment 4300, comprises general-purpose or special-purpose network hardware devices 4330 comprising a set of one or more processors or processing circuitry 4360, which may be commercial off-the-shelf (COTS) processors, dedicated Application Specific Integrated Circuits (ASICs), or any other type of processing circuitry including digital or analog hardware components or special purpose processors. Each hardware device may comprise memory 4390-1 which may be non-persistent memory for temporarily storing instructions 4395 or software executed by processing circuitry 4360. Each hardware device may comprise one or more network interface controllers (NICs) 4370, also known as network interface cards, which include physical network interface 4380. Each hardware device may also include non-transitory, persistent, machine-readable storage media 4390-2 having stored therein software 4395 and/or instructions executable by processing circuitry 4360. Software 4395 may include any type of software including software for instantiating one or more virtualization layers 4350 (also referred to as hypervisors), software to execute virtual machines 4340 as well as software allowing it to execute functions, features and/or benefits described in relation with some embodiments described herein.

Virtual machines 4340 comprise virtual processing, virtual memory, virtual networking or interface and virtual storage, and may be run by a corresponding virtualization layer 4350 or hypervisor. Different embodiments of the instance of virtual appliance 4320 may be implemented on one or more of virtual machines 4340, and the implementations may be made in different ways.

During operation, processing circuitry 4360 executes software 4395 to instantiate the hypervisor or virtualization layer 4350, which may sometimes be referred to as a virtual machine monitor (VMM). Virtualization layer 4350 may present a virtual operating platform that appears like networking hardware to virtual machine 4340.

As shown in FIG. 18, hardware 4330 may be a standalone network node with generic or specific components. Hardware 4330 may comprise antenna 43225 and may implement some functions via virtualization. Alternatively, hardware 4330 may be part of a larger cluster of hardware (e.g. such as in a data center or customer premise equipment (CPE)) where many hardware nodes work together and are managed via management and orchestration (MANO) 43100, which, among others, oversees lifecycle management of applications 4320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 4340 may be a software implementation of a physical machine that runs programs as if they were executing on a physical, non-virtualized machine. Each of virtual machines 4340, and that part of hardware 4330 that executes that virtual machine, be it hardware dedicated to that virtual machine and/or hardware shared by that virtual machine with others of the virtual machines 4340, forms a separate virtual network elements (VNE).

Still in the context of NFV, Virtual Network Function (VNF) is responsible for handling specific network functions that run in one or more virtual machines 4340 on top of hardware networking infrastructure 4330 and corresponds to application 4320 in FIG. 18.

In some embodiments, one or more radio units 43200 that each include one or more transmitters 43220 and one or more receivers 43210 may be coupled to one or more antennas 43225. Radio units 43200 may communicate directly with hardware nodes 4330 via one or more appropriate network interfaces and may be used in combination with the virtual components to provide a virtual node with radio capabilities, such as a radio access node or a base station.

In some embodiments, some signalling can be effected with the use of control system 43230 which may alternatively be used for communication between the hardware nodes 4330 and radio units 43200.

Figure 19:
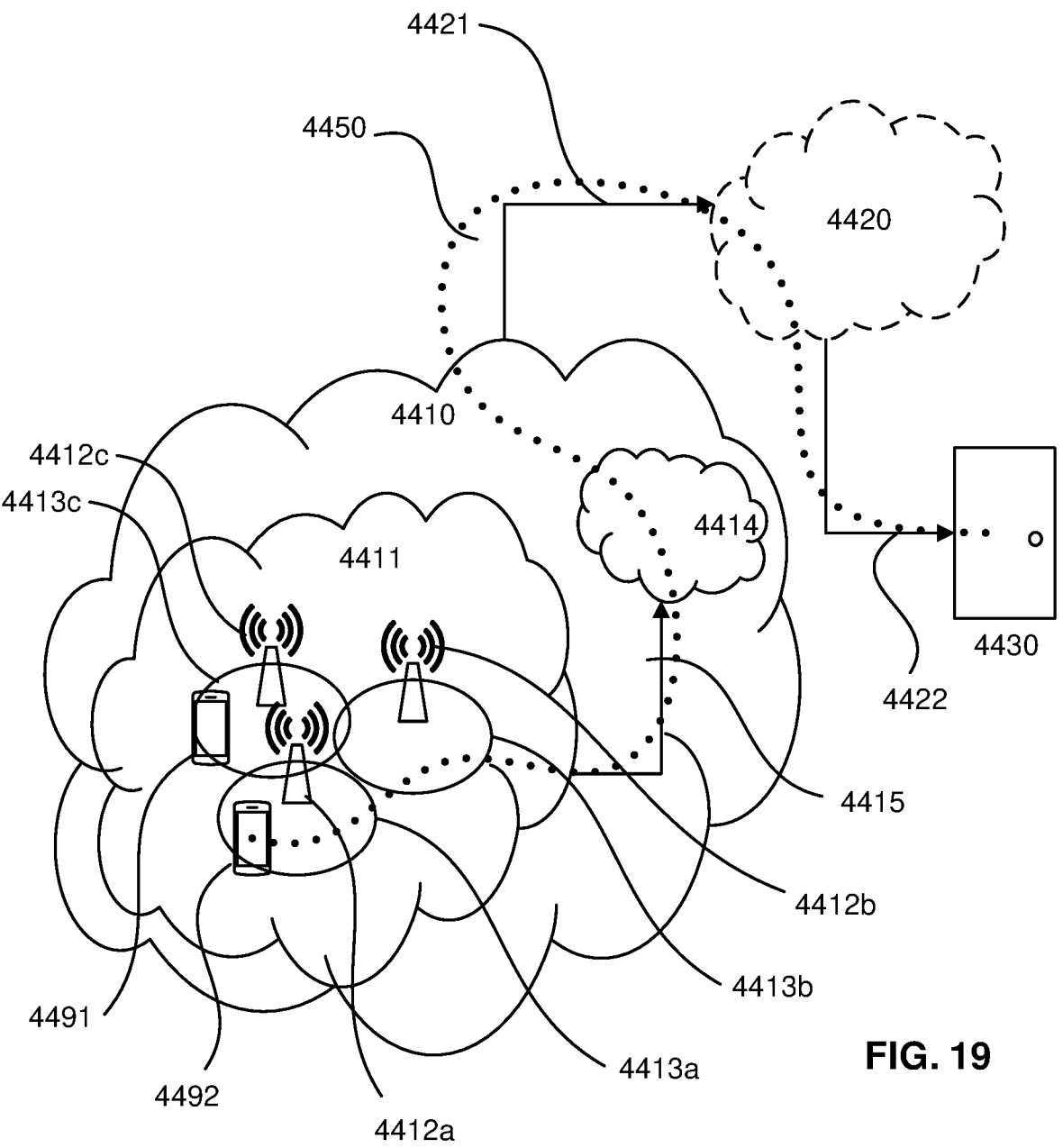
FIG. 19 is a block diagram of a telecommunication network connected via an intermediate network to a host computer in accordance with some embodiments.

FIG. 19 illustrates a telecommunication network connected via an intermediate network to a host computer in accordance with some embodiments.

With reference to FIG. 19, in accordance with an embodiment, a communication system includes telecommunication network 4410, such as a 3GPP-type cellular network, which comprises access network 4411, such as a radio access network, and core network 4414. Access network 4411 comprises a plurality of base stations 4412a, 4412b, 4412c, such as NBs, eNBs, gNBs or other types of wireless access points, each defining a corresponding coverage area 4413a, 4413b, 4413c. Each base station 4412a, 4412b, 4412c is connectable to core network 4414 over a wired or wireless connection 4415. A first UE 4491 located in coverage area 4413c is configured to wirelessly connect to, or be paged by, the corresponding base station 4412c. A second UE 4492 in coverage area 4413a is wirelessly connectable to the corresponding base station 4412a. While a plurality of UEs 4491, 4492 are illustrated in this example, the disclosed embodiments are equally applicable to a situation where a sole UE is in the coverage area or where a sole UE is connecting to the corresponding base station 4412.

Telecommunication network 4410 is itself connected to host computer 4430, which may be embodied in the hardware and/or software of a standalone server, a cloud-implemented server, a distributed server or as processing resources in a server farm. Host computer 4430 may be under the ownership or control of a service provider, or may be operated by the service provider or on behalf of the service provider. Connections 4421 and 4422 between telecommunication network 4410 and host computer 4430 may extend directly from core network 4414 to host computer 4430 or may go via an optional intermediate network 4420. Intermediate network 4420 may be one of, or a combination of more than one of, a public, private or hosted network; intermediate network 4420, if any, may be a backbone network or the Internet; in particular, intermediate network 4420 may comprise two or more sub-networks (not shown).

The communication system of FIG. 19 as a whole enables connectivity between the connected UEs 4491, 4492 and host computer 4430. The connectivity may be described as an over-the-top (OTT) connection 4450. Host computer 4430 and the connected UEs 4491, 4492 are configured to communicate data and/or signaling via OTT connection 4450, using access network 4411, core network 4414, any intermediate network 4420 and possible further infrastructure (not shown) as intermediaries. OTT connection 4450 may be transparent in the sense that the participating communication devices through which OTT connection 4450 passes are unaware of routing of uplink and downlink communications. For example, base station 4412 may not or need not be informed about the past routing of an incoming downlink communication with data originating from host computer 4430 to be forwarded (e.g., handed over) to a connected UE 4491. Similarly, base station 4412 need not be aware of the future routing of an outgoing uplink communication originating from the UE 4491 towards the host computer 4430.

Figure 20:
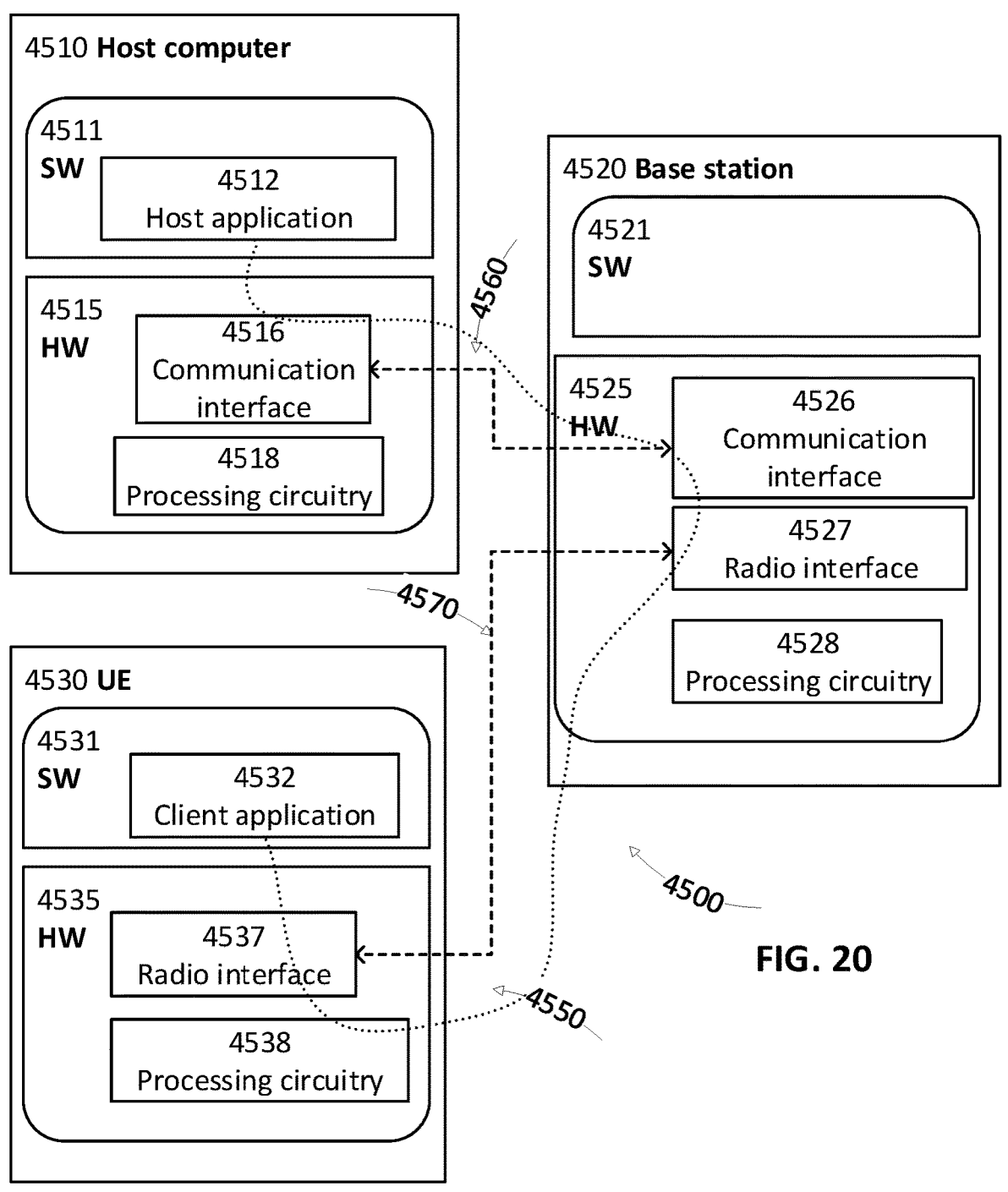
FIG. 20 is a block diagram of a host computer communicating via a base station with a user equipment over a partially wireless connection in accordance with some embodiments.

FIG. 20 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 20. In communication system 4500, host computer 4510 comprises hardware 4515 including communication interface 4516 configured to set up and maintain a wired or wireless connection with an interface of a different communication device of communication system 4500. Host computer 4510 further comprises processing circuitry 4518, which may have storage and/or processing capabilities. In particular, processing circuitry 4518 may comprise one or more programmable processors, application-specific integrated circuits, field programmable gate arrays or combinations of these (not shown) adapted to execute instructions. Host computer 4510 further comprises software 4511, which is stored in or accessible by host computer 4510 and executable by processing circuitry 4518. Software 4511 includes host application 4512. Host application 4512 may be operable to provide a service to a remote user, such as UE 4530 connecting via OTT connection 4550 terminating at UE 4530 and host computer 4510. In providing the service to the remote user, host application 4512 may provide user data which is transmitted using OTT connection 4550.

Communication system 4500 further includes base station 4520 provided in a telecommunication system and comprising hardware 4525 enabling it to communicate with host computer 4510 and with UE 4530. Hardware 4525 may include communication interface 4526 for setting up and maintaining a wired or wireless connection with an interface of a different communication device of communication system 4500, as well as radio interface 4527 for setting up and maintaining at least wireless connection 4570 with UE 4530 located in a coverage area (not shown in FIG. 20) served by base station 4520. Communication interface 4526 may be configured to facilitate connection 4560 to host computer 4510. Connection 4560 may be direct or it may pass through a core network (not shown in FIG. 20) of the telecommunication system and/or through one or more intermediate networks outside the telecommunication system. In the embodiment shown, hardware 4525 of base station 4520 further includes processing circuitry 4528, which may comprise one or more programmable processors, application-specific integrated circuits, field programmable gate arrays or combinations of these (not shown) adapted to execute instructions. Base station 4520 further has software 4521 stored internally or accessible via an external connection.

Communication system 4500 further includes UE 4530 already referred to. Its hardware 4535 may include radio interface 4537 configured to set up and maintain wireless connection 4570 with a base station serving a coverage area in which UE 4530 is currently located. Hardware 4535 of UE 4530 further includes processing circuitry 4538, which may comprise one or more programmable processors, application-specific integrated circuits, field programmable gate arrays or combinations of these (not shown) adapted to execute instructions. UE 4530 further comprises software 4531, which is stored in or accessible by UE 4530 and executable by processing circuitry 4538. Software 4531 includes client application 4532. Client application 4532 may be operable to provide a service to a human or non-human user via UE 4530, with the support of host computer 4510. In host computer 4510, an executing host application 4512 may communicate with the executing client application 4532 via OTT connection 4550 terminating at UE 4530 and host computer 4510. In providing the service to the user, client application 4532 may receive request data from host application 4512 and provide user data in response to the request data. OTT connection 4550 may transfer both the request data and the user data. Client application 4532 may interact with the user to generate the user data that it provides.

It is noted that host computer 4510, base station 4520 and UE 4530 illustrated in FIG. 20 may be similar or identical to host computer 4430, one of base stations 4412a, 4412b, 4412c and one of UEs 4491, 4492 of FIG. 19, respectively. This is to say, the inner workings of these entities may be as shown in FIG. 20 and independently, the surrounding network topology may be that of FIG. 19.

In FIG. 20, OTT connection 4550 has been drawn abstractly to illustrate the communication between host computer 4510 and UE 4530 via base station 4520, without explicit reference to any intermediary devices and the precise routing of messages via these devices. Network infrastructure may determine the routing, which it may be configured to hide from UE 4530 or from the service provider operating host computer 4510, or both. While OTT connection 4550 is active, the network infrastructure may further take decisions by which it dynamically changes the routing (e.g., on the basis of load balancing consideration or reconfiguration of the network).

Wireless connection 4570 between UE 4530 and base station 4520 is in accordance with the teachings of the embodiments described throughout this disclosure. One or more of the various embodiments may improve the performance of OTT services provided to UE 4530 using OTT connection 4550, in which wireless connection 4570 forms the last segment. More precisely, the teachings of these embodiments may improve the random access speed and/or reduce random access failure rates and thereby provide benefits such as faster and/or more reliable random access.

A measurement procedure may be provided for the purpose of monitoring data rate, latency and other factors on which the one or more embodiments improve. There may further be an optional network functionality for reconfiguring OTT connection 4550 between host computer 4510 and UE 4530, in response to variations in the measurement results. The measurement procedure and/or the network functionality for reconfiguring OTT connection 4550 may be implemented in software 4511 and hardware 4515 of host computer 4510 or in software 4531 and hardware 4535 of UE 4530, or both. In embodiments, sensors (not shown) may be deployed in or in association with communication devices through which OTT connection 4550 passes; the sensors may participate in the measurement procedure by supplying values of the monitored quantities exemplified above, or supplying values of other physical quantities from which software 4511, 4531 may compute or estimate the monitored quantities. The reconfiguring of OTT connection 4550 may include message format, retransmission settings, preferred routing etc.; the reconfiguring need not affect base station 4520, and it may be unknown or imperceptible to base station 4520. Such procedures and functionalities may be known and practiced in the art. In certain embodiments, measurements may involve proprietary UE signaling facilitating host computer 4510's measurements of throughput, propagation times, latency and the like. The measurements may be implemented in that software 4511 and 4531 causes messages to be transmitted, in particular empty or 'dummy' messages, using OTT connection 4550 while it monitors propagation times, errors etc.

Figure 21:
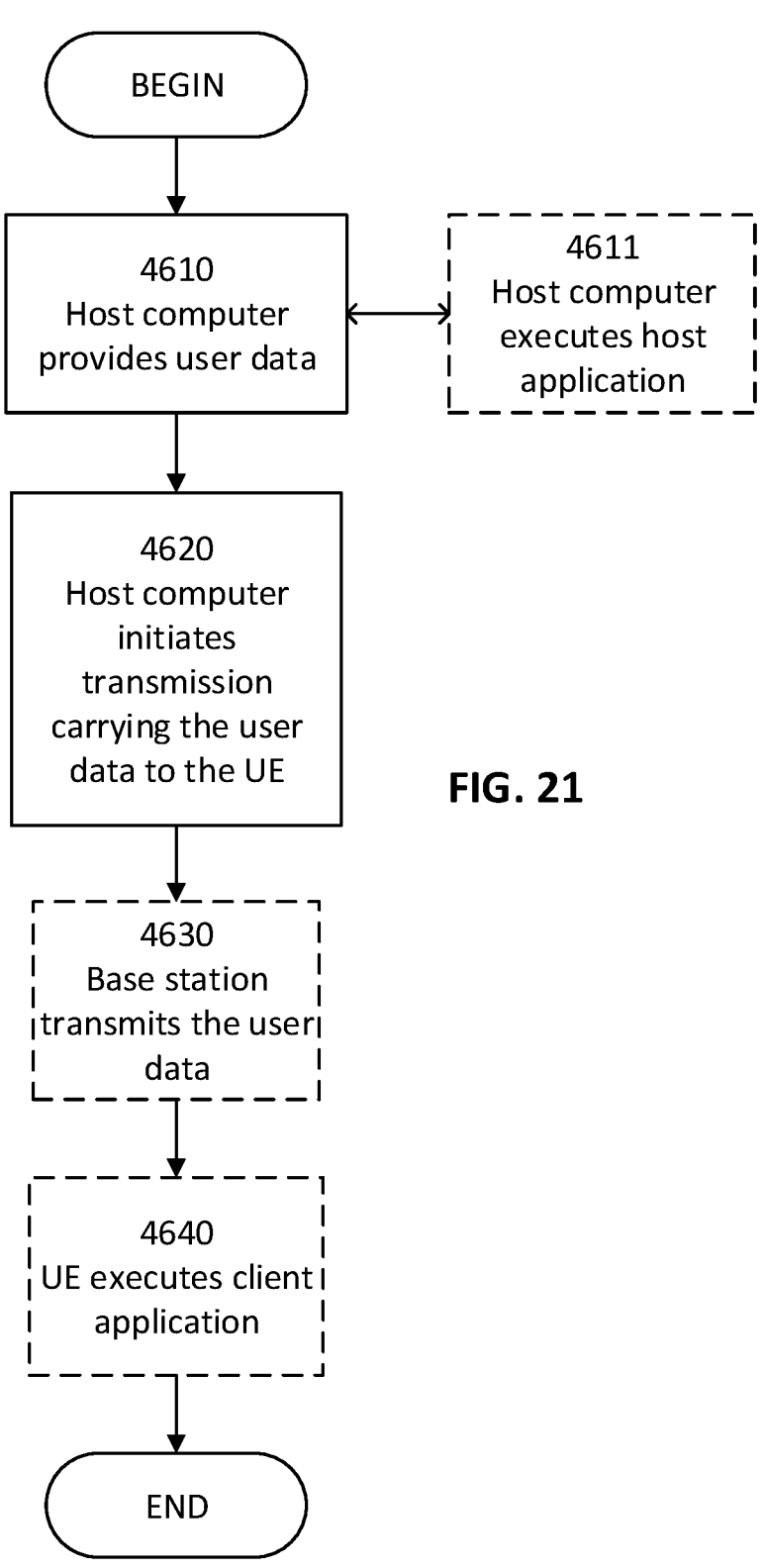
FIG. 21 is a block diagram of methods implemented in a communication system including a host computer, a base station, and a user equipment in accordance with some embodiments.

FIG. 21 illustrates methods implemented in a communication system including a host computer, a base station and a user equipment in accordance with some embodiments FIG. 21 is a flowchart illustrating a method implemented in a communication system, in accordance with one embodiment. The communication system includes a host computer, a base station and a UE which may be those described with reference to FIGS. 19-20. For simplicity of the present disclosure, only drawing references to FIG. 21 will be included in this section. In step 4610, the host computer provides user data. In substep 4611 (which may be optional) of step 4610, the host computer provides the user data by executing a host application. In step 4620, the host computer initiates a transmission carrying the user data to the UE. In step 4630 (which may be optional), the base station transmits to the UE the user data which was carried in the transmission that the host computer initiated, in accordance with the teachings of the embodiments described throughout this disclosure. In step 4640 (which may also be optional), the UE executes a client application associated with the host application executed by the host computer.

Figure 22:
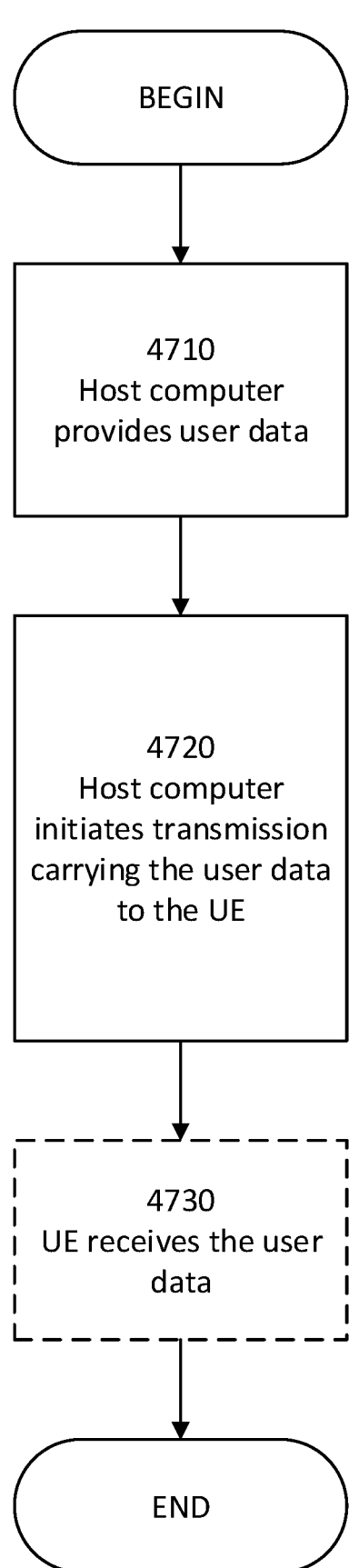
FIG. 22 is a block diagram of methods implemented in a communication system including a host computer, a base station, and a user equipment in accordance with some embodiments.

FIG. 22 illustrates methods implemented in a communication system including a host computer, a base station and a user equipment in accordance with some embodiments.

FIG. 22 is a flowchart illustrating a method implemented in a communication system, in accordance with one embodiment. The communication system includes a host computer, a base station and a UE which may be those described with reference to FIGS. 19-20. For simplicity of the present disclosure, only drawing references to FIG. 22 will be included in this section. In step 4710 of the method, the host computer provides user data. In an optional substep (not shown) the host computer provides the user data by executing a host application. In step 4720, the host computer initiates a transmission carrying the user data to the UE. The transmission may pass via the base station, in accordance with the teachings of the embodiments described throughout this disclosure. In step 4730 (which may be optional), the UE receives the user data carried in the transmission.

Figure 23:
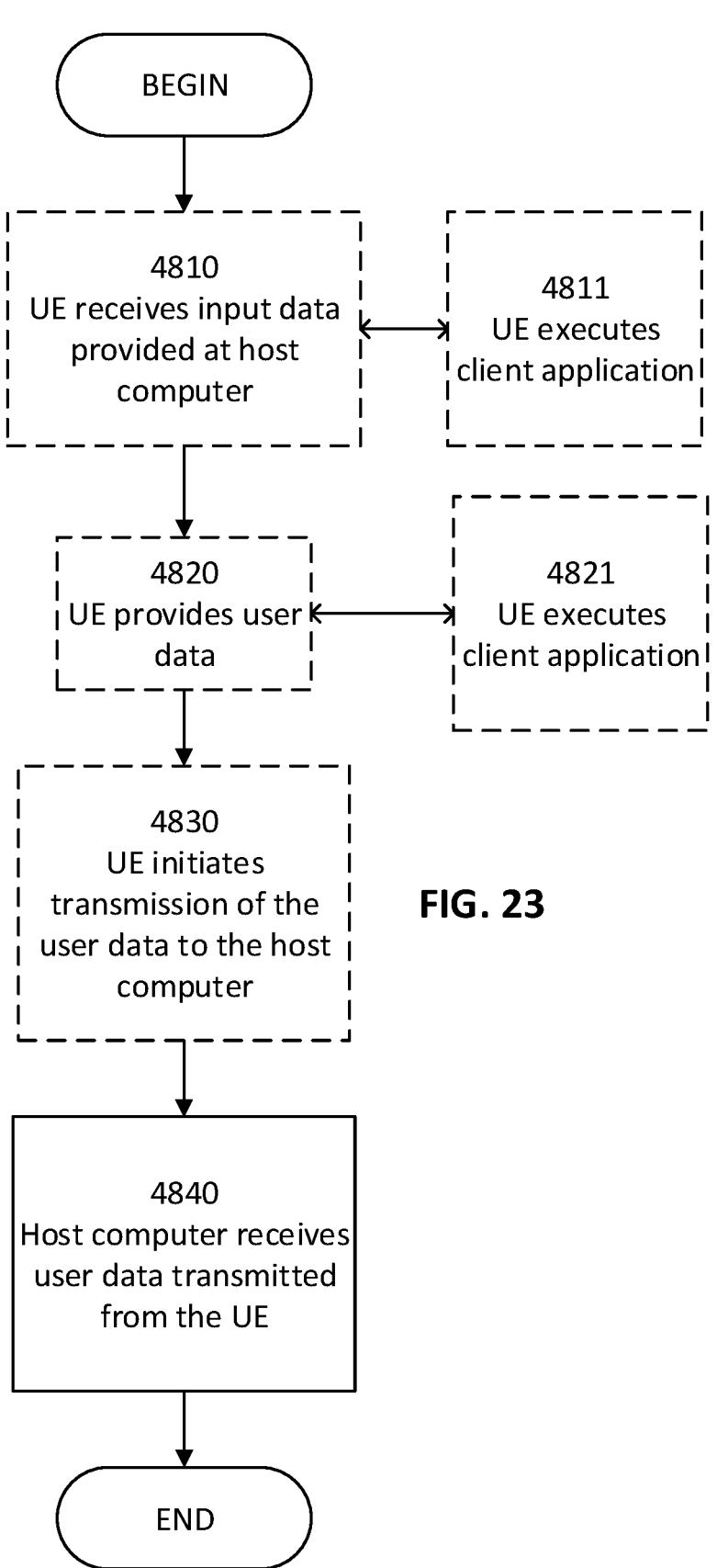
FIG. 23 is a block diagram of methods implemented in a communication system including a host computer, a base station, and a user equipment in accordance with some embodiments.

FIG. 23 illustrates methods implemented in a communication system including a host computer, a base station and a user equipment in accordance with some embodiments FIG. 23 is a flowchart illustrating a method implemented in a communication system, in accordance with one embodiment. The communication system includes a host computer, a base station and a UE which may be those described with reference to FIGS. 19-20. For simplicity of the present disclosure, only drawing references to FIG. 23 will be included in this section. In step 4810 (which may be optional), the UE receives input data provided by the host computer. Additionally or alternatively, in step 4820, the UE provides user data. In substep 4821 (which may be optional) of step 4820, the UE provides the user data by executing a client application.

In substep 4811 (which may be optional) of step 4810, the UE executes a client application which provides the user data in reaction to the received input data provided by the host computer. In providing the user data, the executed client application may further consider user input received from the user. Regardless of the specific manner in which the user data was provided, the UE initiates, in substep 4830 (which may be optional), transmission of the user data to the host computer. In step 4840 of the method, the host computer receives the user data transmitted from the UE, in accordance with the teachings of the embodiments described throughout this disclosure.

Figure 24:
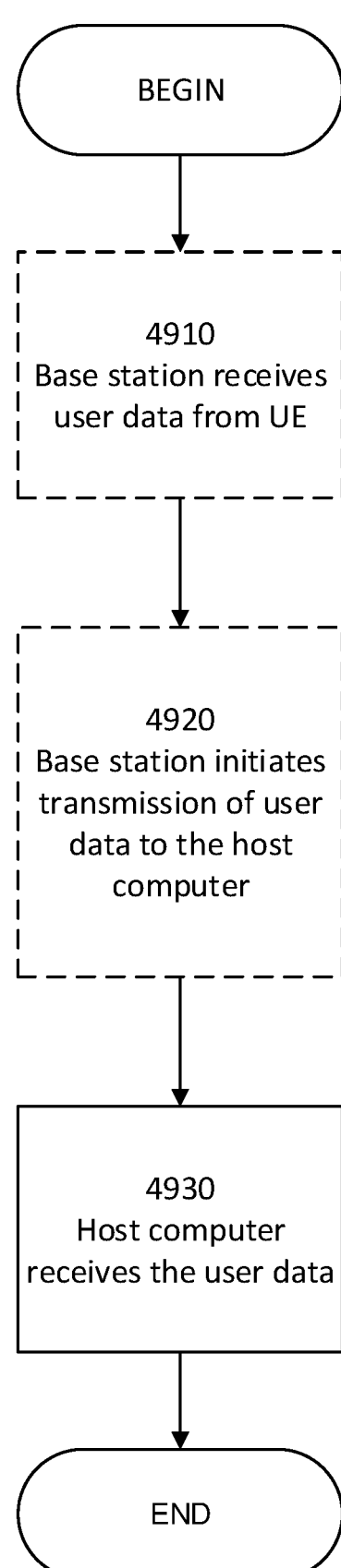
FIG. 24 is a block diagram of methods implemented in a communication system including a host computer, a base station, and a user equipment in accordance with some embodiments.

FIG. 24 illustrates methods implemented in a communication system including a host computer, a base station and a user equipment in accordance with some embodiments FIG. 24 is a flowchart illustrating a method implemented in a communication system, in accordance with one embodiment. The communication system includes a host computer, a base station and a UE which may be those described with reference to FIGS. 19-20. For simplicity of the present disclosure, only drawing references to FIG. 24 will be included in this section. In step 4910 (which may be optional), in accordance with the teachings of the embodiments described throughout this disclosure, the base station receives user data from the UE. In step 4920 (which may be optional), the base station initiates transmission of the received user data to the host computer. In step 4930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HC Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method of operating a first network node in a communication network, the method comprising:

receiving a plan indicating a plurality of tasks to be performed by at least one second network node operating in the communication network, information associated with each task of the plurality of tasks, and a sequence in which to perform the plurality of tasks, the information comprising at least one of:

a criticality of each task of the plurality of tasks; and an indication of concurrent actions of each task of the plurality of tasks;

determining a network slice schedule based on the plurality of tasks to be performed by the at least one second network node operating in the communication network and the sequence in which to perform the plurality of tasks; and providing the network slice schedule to a network slice orchestrator operating in the communication network.

2. The method of claim 1, further comprising:

receiving information associated with a task of the plurality of tasks, wherein determining the network slice schedule comprises determining a slice configuration associated with a portion of the network slice schedule corresponding to the task based on the information.

3. The method of claim 1, where receiving the plan comprises receiving an annotated plan that comprises:

indication of the plurality of tasks to be performed by the at least one second network node operating in the communication network;

indication of the sequence in which to perform the plurality of tasks; and the information associated with each task of the plurality of tasks.

4. The method of claim 1, wherein the information comprises the criticality of each task of the plurality of tasks.

5. The method of claim 1, wherein determining the network slice schedule comprises:

determining a latency requirement and a bandwidth requirement associated with a first task of the plurality of tasks to be performed by a third network node of the at least one second network node based on a portion of information that is associated with the first task of the plurality of tasks;

determining a network resource allocation associated with performing the first task of the plurality of tasks based on the latency requirement and the bandwidth requirement;

determining that the network slice schedule comprises an existing slice associated with an earlier task of the plurality of tasks, the earlier task being scheduled to occur prior to the first task; and responsive to determining that the network slice schedule comprises the existing network slice associated with the earlier task of the plurality of tasks, determining whether to reconfigure the existing network slice associated with the earlier task of the plurality of tasks at a start of the first task to provide the network resource allocation to the third network node during performance of the first task based on the information.

6. The method of claim 5, wherein determining whether to reconfigure the existing network slice associated with the earlier task of the plurality of tasks comprises:

determining a resource cost of reconfiguring the existing network slice to be a new network slice;

determining a resource savings of using the new network slice during the first task rather than the existing network slice during the first task;

responsive to the resource cost of reconfiguring the existing network slice to be new network slice being greater than the resource savings of using the new network slice, determining to maintain the existing network slice during the first task; and responsive to the resource savings of using the new network slice being greater than the resource cost of reconfiguring the existing network slice to be new network slice, determining to reconfigure the existing network slice into the new slice.

7. The method of claim 6, wherein determining the resource cost of reconfiguring the existing network slice to be the new network slice comprises determining an amount of time required to reconfigure the existing network slice into the new network slice, and wherein determining the resource savings of using the new network slice during the first task rather than the existing network slice during the first task comprises determining a difference in network resource allocation between using the new network slice during the first task and using the existing network slice during the first task.

8. The method of claim 1, wherein determining the network slice schedule comprises:

determining, for a plurality of time intervals, whether to add a new network slice, remove an existing network slice, reconfigure the existing network slice, merge the existing network slice with another network slice, or maintain the existing network slice.

9. The method of claim 1, wherein determining the network slice schedule comprises:

generating a data structure of possible network slice actions, times associated with the possible network slice actions, resource cost of performing each of the possible network slice actions, and constraints associated with each task of the plurality of tasks, the possible network slice actions including at least one of: reconfiguring an existing network slice, maintaining the existing network slice, removing the existing network slice, merging existing network slices, and adding a new network slice;

searching the data structure for a minimum cost set of the possible network slice actions to complete the plurality of tasks while meeting the constraints associated with each task of the plurality of tasks; and determining the network slice schedule based on the minimum cost set of the possible network slice actions, and wherein the data structure is a tree structure.

10. The method of claim 1, wherein determining the network slice schedule comprises:

determining that an existing network slice is scheduled to exist when a new task of the plurality of tasks is scheduled to start;

responsive to determining that the existing network slice is scheduled to already exist when the new task of the plurality of tasks is scheduled to start, determining whether it is more efficient to maintain the network slice or reconfigure the network slice;

responsive to determining that it is more efficient to maintain the network slice, generating the network slice schedule to include the network slice being maintained when the new task of the plurality of tasks is scheduled to start; and responsive to determining that it is more efficient to reconfigure the network slice, generating the network slice schedule to include reconfiguring the network slice when the new task of the plurality of tasks is scheduled to start.

11. The method of claim 1, wherein determining the network slice schedule comprises:

determining that a portion of a first task of the plurality of tasks and a portion of a second task of the plurality of tasks are scheduled to occur at the same time;

responsive to determining that the portion of the first task of the plurality of tasks and the portion of the second task of the plurality of tasks are scheduled to occur at the same time, determining that a single network slice will not meet requirements for completing both the first task and the second task;

responsive to determining that the single network slice will not meet the requirements for completing both the first task and the second task, determining whether it is more efficient to reconfigure the single network slice to provide sufficient resources to meet the requirements for completing both the first task and the second task or more efficient to add a new network slice;

responsive to determining that it is more efficient to reconfigure the single network slice, generating the network slice schedule to include reconfiguring the single network slice to provide sufficient resources to meet the requirements for completing both the first task and the second task when the first task or the second task is scheduled to start; and responsive to determining that it is more efficient to add the new network slice, generating the network slice schedule to include adding the new network slice when the first task or the second task is scheduled to start.

12. The method of claim 1, wherein determining the network slice schedule comprises:

determining that a portion of a first task of the plurality of tasks and a portion of a second task of the plurality of tasks are scheduled to occur at the same time;

responsive to determining that the portion of the first task of the plurality of tasks and the portion of the second task of the plurality of tasks are scheduled to occur at the same time, determining that the first task is scheduled to be completed prior to the second task; and responsive to determining that the first task is scheduled to be completed prior to the second task, generating the network slice schedule to include merging a first network slice associated with the first task with a second network slice associated with the second task when the first task is be completed, and wherein being more efficient comprises at least one of:
      using less energy;
      improving performance; and
      using less network resources.

13. The method of claim 1, wherein determining the network slice schedule comprises using artificial intelligence ("AI") planning to autonomously derive a set of initial network slices and network slice reconfigurations to use to configure the communication network during completion of the plurality of tasks.

14. The method of claim 1, wherein determining the network slice schedule comprises determining a service level agreement ("SLA") for each task of the plurality of tasks, and wherein a SLA of a first task of the plurality of tasks is different than a SLA of a second task of the plurality of tasks.

15. The method of claim 1, wherein determining the network slice schedule comprises determining at least one variable network slice associated with one or more tasks of the plurality of tasks, the at least one variable network slice being scheduled to be reconfigured during completion of the plurality of tasks.

16. The method of claim 1, wherein the first network node is a network slice scheduler, the second network node is a terminal device, and the communication network is a new radio ("NR") network.

17. The method of claim 1, wherein providing the network slice schedule to the network slice orchestrator operating in the communication network comprises transmitting the network slice schedule as an input to the network slice orchestrator to cause the network slice orchestrator to reconfigure variable network slices of the communication network during completion of the plan, the network slice schedule indicating when and how to reconfigure the variable network slices.

18. The method of claim 1, wherein the first network node is the network slice orchestrator and is configured to allocate network resources among the at least one second network node during performance of the plurality of tasks based on the network slice schedule.

19. A first network node operating in a communication network, the first network node comprising:

processing circuitry; and memory coupled to the processing circuitry and having instructions stored therein that are executable by the processing circuitry to cause the first network node to perform operations, the operations comprising:

receiving a plan indicating a plurality of tasks to be performed by at least one second network node operating in the communication network, information associated with each task of the plurality of tasks, and a sequence in which to perform the plurality of tasks, the information comprising at least one of:

a criticality of each task of the plurality of tasks; and an indication of concurrent actions of each task of the plurality of tasks;

determining a network slice schedule based on the plurality of tasks to be performed by the at least one second network node operating in the communication network and the sequence in which to perform the plurality of tasks; and providing the network slice schedule to a network slice orchestrator operating in the communication network.

20. A non-transitory computer readable medium having instructions stored therein that are executable by processing circuitry of a first network node operating in a communication network to cause the first network node to perform operations comprising:

receiving a plan indicating a plurality of tasks to be performed by at least one second network node operating in the communication network, information associated with each task of the plurality of tasks, and a sequence in which to perform the plurality of tasks, the information comprising at least one of:

a criticality of each task of the plurality of tasks; and an indication of concurrent actions of each task of the plurality of tasks;

determining a network slice schedule based on the plurality of tasks to be performed by the at least one second network node operating in the communication network and the sequence in which to perform the plurality of tasks; and providing the network slice schedule to a network slice orchestrator operating in the communication network.

\* \* \* \* \*